United States Patent
Johnson et al.

(10) Patent No.: US 10,338,593 B2
(45) Date of Patent: Jul. 2, 2019

(54) HYDRAULIC SLIP COMPENSATION SYSTEMS AND METHODS

(71) Applicant: FLIR Systems, Inc., Wilsonville, OR (US)

(72) Inventors: Mark Johnson, Vannes (FR); Chris Yeomans, Fareham (GB); Richard Moth, Hampshire (GB)

(73) Assignee: FLIR SYSTEMS, INC., Wilsonville, OR (US)

( * ) Notice: Subject to any disclaimer, the term of this patent is extended or adjusted under 35 U.S.C. 154(b) by 0 days.

(21) Appl. No.: 15/222,905

(22) Filed: Jul. 28, 2016

(65) Prior Publication Data

US 2016/0334794 A1    Nov. 17, 2016

Related U.S. Application Data

(63) Continuation of application No. PCT/US2015/013141, filed on Jan. 27, 2015.

(60) Provisional application No. 61/934,678, filed on Jan. 31, 2014.

(51) Int. Cl.
    *G05D 1/02*     (2006.01)
    *B63H 25/30*     (2006.01)
    *B63H 25/08*     (2006.01)

(52) U.S. Cl.
    CPC ........... *G05D 1/0206* (2013.01); *B63H 25/08* (2013.01); *B63H 25/30* (2013.01)

(58) Field of Classification Search
    CPC ....... B63H 25/08; B63H 25/30; G05D 1/0206
    See application file for complete search history.

(56) References Cited

U.S. PATENT DOCUMENTS

| | | | |
|---|---|---|---|
| 3,488,954 A | | 1/1970 | Thomas et al. |
| 6,820,567 B1 * | | 11/2004 | Kishi ............... B63H 25/30 114/150 |
| 7,469,168 B1 | | 12/2008 | Richey |
| 2012/0132120 A1 | | 5/2012 | Gai et al. |
| 2012/0290175 A1 * | | 11/2012 | Hisanaga ............ B62D 5/061 701/41 |
| 2013/0276688 A1 * | | 10/2013 | Ekuni .................. B63H 25/04 114/162 |

FOREIGN PATENT DOCUMENTS

| | | |
|---|---|---|
| GB | 1223986 | 3/1971 |
| GB | 1419244 | 12/1975 |

* cited by examiner

*Primary Examiner* — Khoi H Tran
*Assistant Examiner* — Robert T Nguyen
(74) *Attorney, Agent, or Firm* — Haynes and Boone, LLP

(57) ABSTRACT

Techniques are disclosed for systems and methods to provide accurate positioning for a hydraulic steering system without a need for a steering reference transducer. A hydraulic steering system may include a logic device in communication with an autopilot pump controller. Control and sensor signals provided by the pump controller are used to determine a linear or uncompensated steering actuator speed and an estimate of the hydraulic elasticity of the steering system, which can be modeled as an estimate of the air volume trapped within the steering system. The hydraulic elasticity/air volume estimate is used to determine a corrected or compensated steering actuator speed, and the corrected steering actuator speed is used to accurately control the steering system.

24 Claims, 21 Drawing Sheets

HYDRAULIC SLIP COMPENSATION SYSTEMS AND METHODS

CROSS-REFERENCE TO RELATED APPLICATIONS

This application is a continuation of International Patent Application No. PCT/US2015/013141 filed Jan. 27, 2015 and entitled "HYDRAULIC SLIP COMPENSATION SYSTEMS AND METHODS," which claims priority to and the benefit of U.S. Provisional Patent Application No. 61/934,678 filed Jan. 31, 2014 and entitled "HYDRAULIC SLIP COMPENSATION SYSTEMS AND METHODS," which are both hereby incorporated by reference in their entirety.

TECHNICAL FIELD

One or more embodiments of the invention relate generally to hydraulic slip compensation and more particularly, for example, to systems and methods for providing accurate positioning for a hydraulic steering system.

BACKGROUND

Hydraulic steering systems typically include a user interface pump (e.g., a yolk or a helm pump) connected to a steering cylinder or other type of hydraulic actuator that is used to change the position of a steering control surface, such as a rudder and/or an articulated propulsion system/outboard motor on a ship or an airplane. Conventional autopilot installations for hydraulic systems add a motorized reversing autopilot pump and a reference transducer or sensor coupled to the steering control surface to provide accurate steering angles/positions as feedback to the autopilot controller. The disconnect between the speed of a hydraulic pump motor and the rate of movement of a coupled hydraulic actuator is often so significant and variable that a reference transducer/sensor is necessary for reliable autopilot control.

Unfortunately, reference transducers/sensors are typically expensive, fragile, and difficult to install and maintain, particularly with respect to open vehicles or other mobile structures, such as power boats, that do not or cannot provide a dry, enclosed, or otherwise protected space around an outboard motor, tiller assembly, and/or steering cylinder. Mechanically steered autopilot installations can operate successfully without a reference transducer/sensor, because steering angles/positions can be estimated reliably and with sufficient accuracy by integrating a mechanically linked motor speed and using known gearing ratios between the motor and the steering angle, but mechanical steering systems can also be fragile and difficult to maintain and/or repair, and they are often limited for use with relatively small mobile structures.

Thus, there is a need for an improved methodology to provide inexpensive, accurate, and reliable positioning for a hydraulic actuator, particularly in the context of a hydraulic actuator used to steer a mobile structure.

SUMMARY

Techniques are disclosed for systems and methods to provide accurate positioning for a hydraulic steering system for mobile structures. In one embodiment, a hydraulic steering system may include a logic device in communication with an autopilot pump controller. Control and sensor signals provided by the pump controller may be used to determine a linear or uncompensated steering actuator speed and an estimate of the hydraulic elasticity of the steering system, which may be modeled as and/or equivalent to an estimate of the air volume trapped within the steering system. The hydraulic elasticity/air volume estimate may be used to determine a corrected or compensated steering actuator speed, and the corrected steering actuator speed may be used to accurately control the steering system without need for a steering reference transducer. In some embodiments, the steering system may receive yaw rates of a coupled mobile structure and use the yaw rates to help estimate the elasticity of the steering system.

For example, an estimated steering angle/position can be determined from the corrected steering actuator speed, and the estimated steering angle/position may be used by an autopilot controller to steer a mobile structure according to a desired or target heading. As used herein, an estimated steering angle/position that can be used in such a manner may be referred to as a "virtual rudder" or a "virtual rudder estimate."

In various embodiments, a hydraulic steering system may include an autopilot pump, a pump controller, a yaw rate sensor, one or more additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a logic device configured to receive one or more sensor and/or control signals and determine a virtual rudder estimate for a hydraulic steering system coupled to a mobile structure, wherein the logic device is adapted to receive a pump control signal for the hydraulic steering system and determine a linear rudder speed based, at least in part, on the pump control signal; determine an elasticity estimate for the hydraulic steering system; and determine the virtual rudder estimate from a corrected rudder speed, wherein the corrected rudder speed is based, at least in part, on the linear rudder speed, the pump control signal, and/or the elasticity estimate.

In another embodiment, a method may include determining a linear rudder speed based, at least in part, on a pump control signal for a hydraulic steering system of a mobile structure; determining an elasticity estimate for the hydraulic steering system; and determining a virtual rudder estimate from a corrected rudder speed, wherein the corrected rudder speed is based, at least in part, on the linear rudder speed, the pump control signal, and/or the elasticity estimate.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
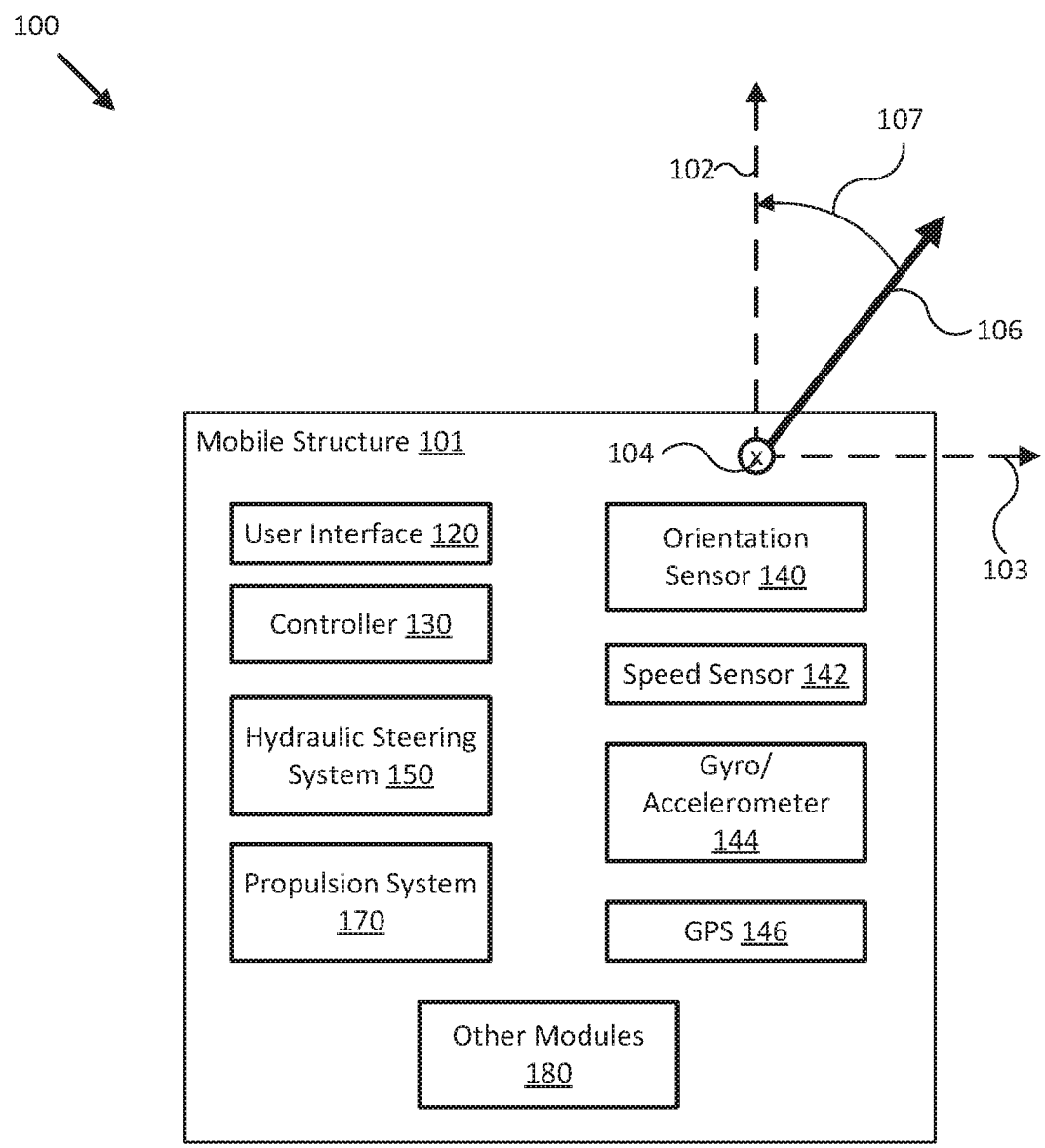
FIG. 1 illustrates a block diagram of a hydraulic steering system in accordance with an embodiment of the disclosure.

In accordance with various embodiments of the present disclosure, hydraulic steering systems and methods may advantageously include an autopilot/hydraulic pump controller in conjunction with a gyroscope and/or a heading sensor providing measurements of a yaw rate and/or a heading of a mobile structure. For example, the gyroscope and/or heading sensor may be mounted to or within the mobile structure (e.g., a watercraft, aircraft, and/or other steered mobile structure), or may be integrated with the autopilot/hydraulic pump controller. Embodiments of the present disclosure can reliably hydraulically steer a mobile structure using hydraulic pump control signals and, in some embodiments, a yaw rate of the mobile structure. Any such embodiments may be used to reliably hydraulically steer a mobile structure without input from a control surface reference transducer/sensor (e.g., a rudder reference transducer).

Conventional hydraulic steering systems typically include a reference transducer/sensor because they suffer from a phenomenon referred to herein as "hydraulic slip." Hydraulic slip is a catch-all term that refers to the numerous causes of disconnect between the speed of a hydraulic pump motor and the rate of movement of a coupled hydraulic actuator. For example, causes of hydraulic slip include: motor speed measurement errors; backlash or play in the gearing and linkages between the pump motor and the pump and the hydraulic actuator and the steering control surface; fluid leakage past the gears in a geared reversing hydraulic pump; different effective volume and area when pumping to port verses to starboard for single ended/unbalanced steering cylinders (arising due to the volume and position of the steering rod, which can be up to 20% of the fluid volume of the cylinder and therefore results in the motor speed correlation to rudder angle asymmetric by up to 20%); flexibility in the walls of various cavities and lines of a hydraulic system; and compression and expansion of air in the hydraulic fluid. Hydraulic slip is typically so significant and variable that pump motor speed integration is effectively unusable, by itself, for reliable autopilot control.

Embodiments of the present disclosure determine a reliable virtual rudder estimate without resorting to a steering actuator/control surface reference transducer/sensor by estimating the hydraulic slip from other sensor and/or control signals and deriving the virtual rudder estimate from the hydraulic slip. As noted above, a "virtual rudder" or a "virtual rudder estimate," as used herein, is an estimated steering angle/position that may be used by an autopilot or other type of controller of a steering system, for example, to steer a mobile structure according to a desired heading.

Conceptually, hydraulic slip may be broken down into two components, linear hydraulic slip and non-linear hydraulic slip. As used herein, linear hydraulic slip includes contributions of hydraulic slip that are proportional to the load, speed, and/or direction of a pump motor used to control the hydraulic system. Thus, the rate of linear hydraulic slip may be reliably estimated from measureable characteristics of the motor once the proportionalities are determined.

For example, the load-based linear slip rate (e.g., the pump motor, pump gear, and/or fluid pumping slip rate) may be characterized by measuring the slip rate of the pump against load, such as a known load on a test bench. The load-based linear slip rate will typically vary for different motor speeds (e.g., produced by different pulse-width modulations (PWMs) used to drive the motor), and so a full slip characterization may take the form of a two dimensional lookup table where the pump contribution to the linear slip rate is a function of motor speed and load. Typically, hydraulic pump manufacturers supply a linear slip rate characterization with the pump, but a linear slip rate characterization can also be derived from operation of a fully or partially implemented steering system with or without prior knowledge of the slip rate characteristics of the pump, as described herein. For DC motors, the load experienced by the motor may be a function of the motor's supply voltage and back electromotive force (back EMF), where the load is roughly equal to the (back EMF−supply voltage)/supply voltage. In typical operation, an autopilot may be configured to measure a pump motor's supply voltage directly, and to sense/estimate the back EMF by energizing the motor, momentarily floating the motor's electrical terminals (allowing the motor to act as a dynamo), and measuring the generated terminal voltage. The load and speed based linear slip rate may then be determined from the calculated load and the pump's slip characterization.

The presence of a linear slip rate due to a directional imbalance (e.g., an unbalanced steering cylinder, and/or other fluid flow directional imbalances in a hydraulic steering system) may be detected using a stationary and/or dockside setup process. For example, an autopilot may be configured to drive a coupled steering actuator full stroke from a port end stop to a starboard end stop, then full stroke in the opposite direction, and to monitor and integrate the motor's back EMF over the full stroke for each drive direction. The integrated back EMF in each direction is roughly proportional to the corresponding full stroke displacement of the steering actuator, and the full stroke displacements are equal, so asymmetry in the integrated back EMFs is a measure or estimation of the directional imbalance of the steering system.

In some embodiments, the ratio of the integrated back EMFs may be used to compensate for a directional imbalance based linear slip rate, as described herein. In other embodiments, one or both integrated back EMFs and/or individual back EMF measurements may be used to characterize the pump's linear slip rates according to the load and speed(s) used to perform the full stroke drives, for example, and/or according to one or more user provided parameters, such as a full stroke sweep angle. End stops (e.g., of the steering actuator and/or the control surface/rudder) may be detected by monitoring the pump motor back EMF and/or speed and detecting a large change over a short period of time. For example, the motor may be substantially unable to turn and/or generate a back EMF when an end stop is reached and fluid cannot be pumped in the corresponding direction. In some embodiments, a user may indicate end stops by actuating a button or other component of a user interface. Once the various contributions to the linear slip rate are characterized, the linear slip rate can be determined and used to derive a linear rudder speed as the basis for a virtual rudder estimate, as described more fully below.

As used herein, non-linear hydraulic slip includes contributions of hydraulic slip that cannot be mapped and compensated for linearly. The principal cause of non-linear slip in a hydraulic steering system is elasticity. Elasticity can arise from air trapped in a poorly bled system, from flexibility in tubing and cavity walls, and/or other mechanisms of a hydraulic steering system. For example, with respect to marine systems specifically, marine systems are not as rigid and/or well-maintained as automotive or industrial hydraulics, and boat park studies indicate that 1° to 3° of control surface elasticity (e.g., rudder elasticity) is typically present. When a hydraulic steering system is loaded asymmetrically (e.g., such as when it is coupled to a propulsion system that produces a lateral/steering load), elasticity in the system has a subtle effect with respect to typical fluid and valve dynamics.

For example, marine motors typically produce an asymmetric load on a watercraft's steering system that is caused by propeller motion convolved with various static and dynamic attributes of the watercraft, typically referred to as "propeller walk". Propeller walk is a substantially lateral force (relative to the propeller's rotation axis) that acts on the steering system directly (e.g., outboard motors), or that acts on the watercraft directly (e.g., inboard motors) and then translates to a force on the steering system through motion of water on one or more rudders. Propeller walk increases with thrust/propeller revolutions per minute (RPM), so that above a critical throttle position, the propeller walk results in an assisting force on a steering actuator/cylinder which exceeds friction in the steering system, giving the steering actuator/cylinder a drive direction which is "assisted."

Figure 11A:
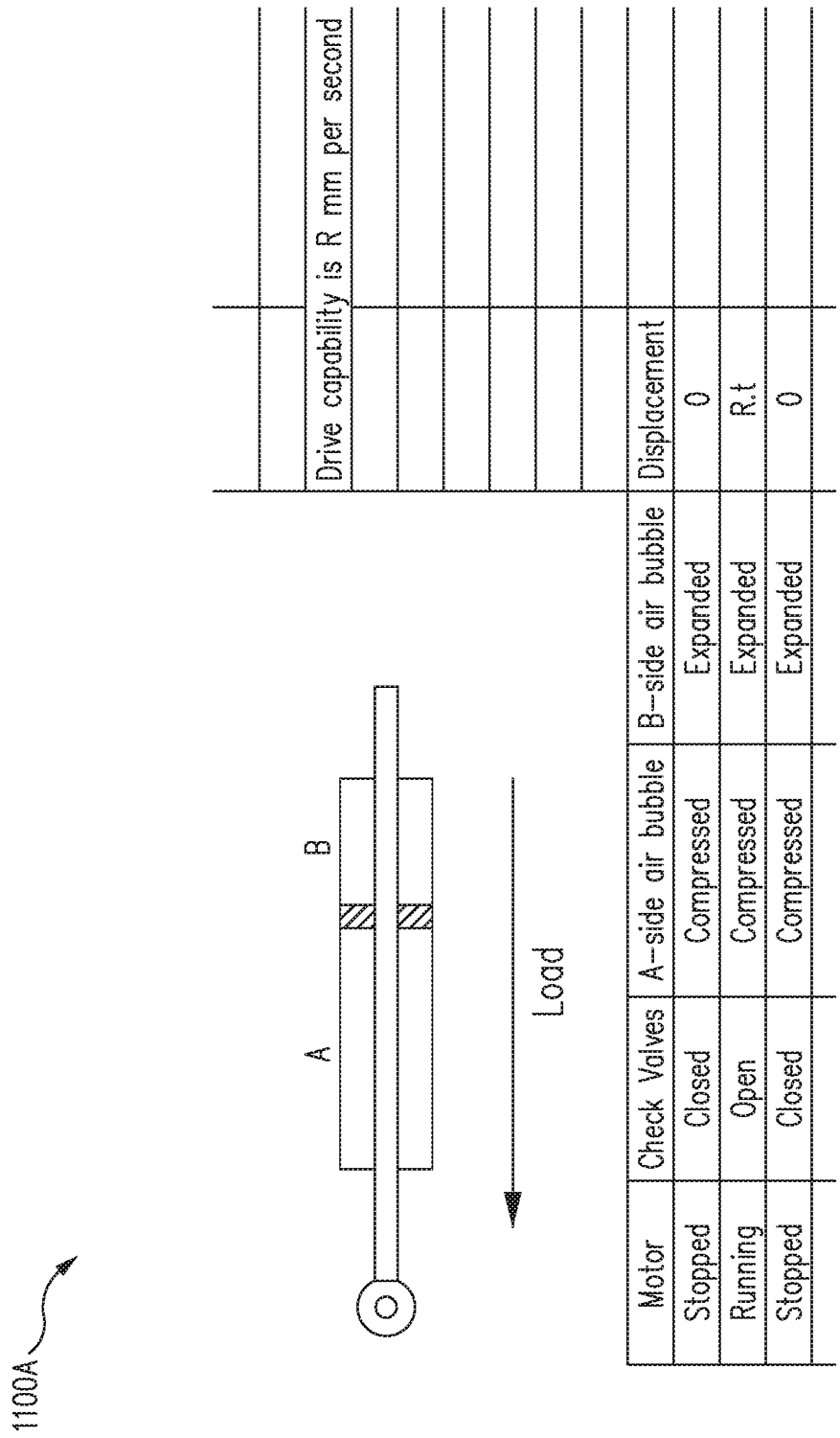
FIGS. 11A-11B illustrate diagrams and charts describing assisted steering actuator responses in the presence of system elasticity for hydraulic steering in accordance with embodiments of the disclosure.
Figure 11B:
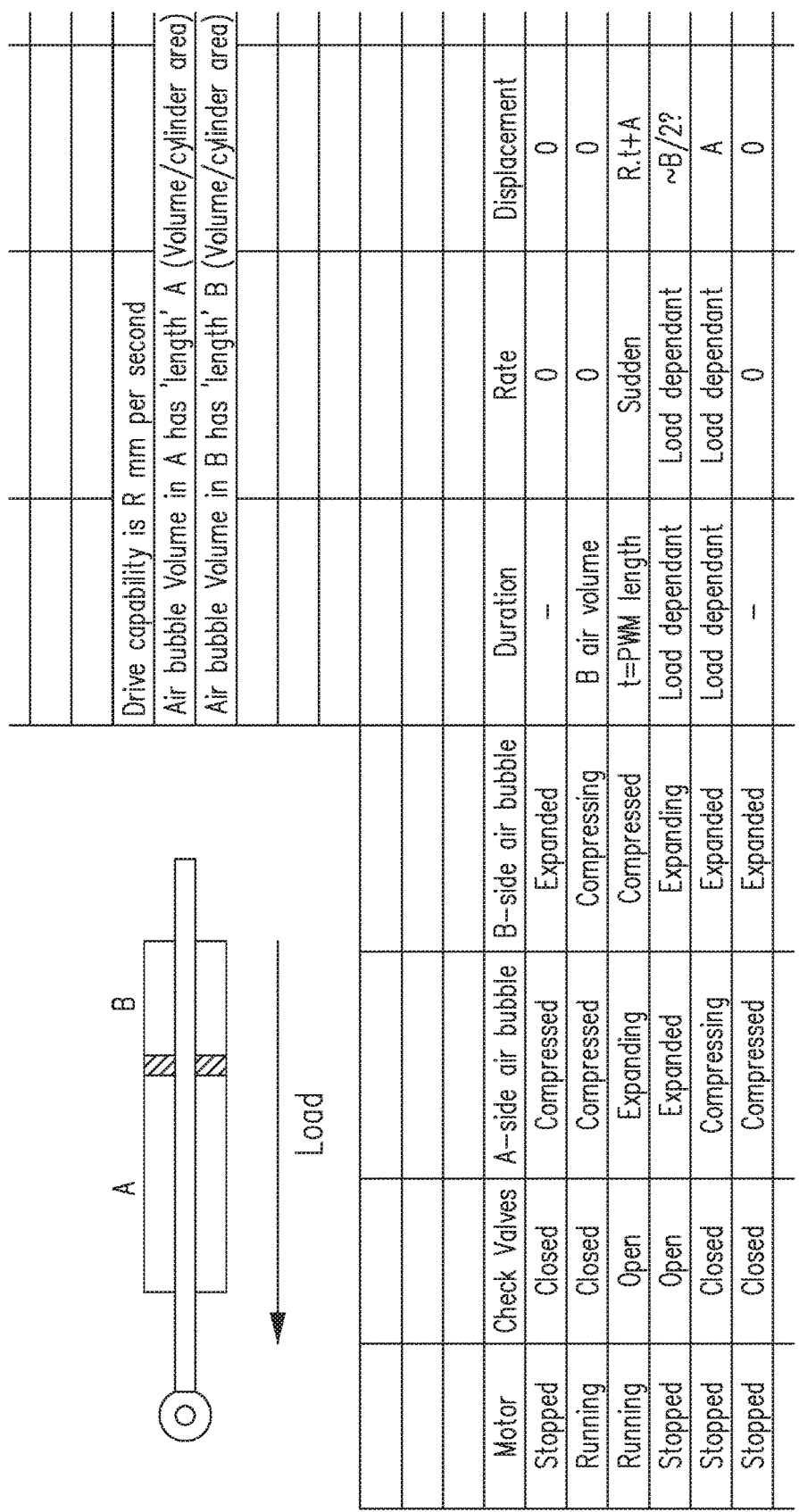

In marine systems, a reversing autopilot pump is typically designed to be connected in parallel to one or more helm pumps, and to prevent back drive, each element (e.g., the autopilot pump and each helm pump) contains check or non-return valves. Each element's valves are linked by a shuttle, so that pump pressure provided to the A side of a pump unseats and opens the A side valve of that pump, which forces the shuttle across and opens the return B side valve of that pump and/or a valve to a coupled reservoir, allowing oil to flow back into the pump and also into or out of the reservoir if necessary to maintain the low pressure side at approximately atmospheric pressure. When a marine steering system suffers from elasticity (which may be attributable to a trapped air bubble and/or system flexibility, but which could have any cause) and propeller walk sufficient to produce net assistance, the two drive directions (loaded and assisted) may behave quite differently. Example charts are provided in FIGS. 11A (e.g., drive is against load) and 11B (drive is with assistance).

For example, for drive pulses in the loaded direction, the steering actuator/cylinder displacement can be reliably estimated by integrating motor speed (e.g., compensated by the linear slip rate) with time. By contrast, for drive pulses in the assisted direction, the displacement is the same integral plus two times the steering system elasticity. The doubling of the elasticity is counter-intuitive: when elasticity is released and compressed in an ideal hydraulic system without valves or hydraulic slip, the system does not experience a net displacement. In a real hydraulic steering system, oil is pushed into the reservoir during the sudden expansion caused by the drive pulse in the assisted direction and then recovered from the reservoir with the opposing valve state, and so there is a net displacement. For example, if a steering system has 1° of elasticity and an autopilot drive pulse attempts to move the system's steering cylinder by 1° in the assisted direction, the result may be a displacement of 3°. As used herein, this process is described as the elasticity of the hydraulic steering system being "ratcheted" by the valve reversal.

As described more fully herein, embodiments of the present disclosure are able to estimate the elasticity of a hydraulic steering system from various sensor and/or control signals and ratchet its effect on the steering system (e.g., providing the non-linear slip rate component of the hydraulic slip). The corresponding linear steering actuator speed can be corrected by the ratcheted elasticity estimate, and the corrected steering actuator speed can be used to determine a reliable and accurate virtual rudder estimate. In various embodiments, this process is adaptive and may be configured to determine the elasticity estimate and/or other contributions to the hydraulic slip without user and/or manufacturer-supplied system characteristics, for example, and to determine a reliable and accurate virtual rudder estimate with or without the presence of a constant and/or or variable assisting force, as described herein. In some embodiments, the elasticity of the steering system and/or other characterizations of the hydraulic slip may be substantially provided, at least in part, by a user and/or manufacturer as one or more system parameters. In such embodiments, this process may be adapted to determine a reliable and accurate virtual rudder estimate using one or more such system parameters.

FIG. 1 illustrates a block diagram of a system 100 including a hydraulic steering system 150 in accordance with an embodiment of the disclosure. In various embodiments, system 100 may be adapted to detect a hydraulic pump drive signal of hydraulic steering system 150 and/or to measure a yaw rate of mobile structure 101. System 100 may then use these detections/measurements to determine a linear steering actuator speed (e.g., a linear rudder speed) for mobile structure 101 and/or an elasticity estimate for hydraulic steering system 150. System 100 may determine a corrected steering actuator speed from the linear steering actuator speed and/or the elasticity estimate, and then derive a virtual rudder estimate from the corrected steering actuator speed. In various embodiments, system 100 may use the virtual rudder estimate to control hydraulic steering system 150 and steer mobile structure 101 according to a desired heading, such as heading angle 107, for example.

In the embodiment shown in FIG. 1, system 100 may be implemented to provide hydraulically actuated autopilot control for a particular type of mobile structure 101, such as an aerial drone, a watercraft, an airplane, and/or other types of mobile structures. In one embodiment, system 100 may include one or more of a user interface 120, a controller 130, an orientation sensor 140, a speed sensor 142, a gyroscope/accelerometer 144, a global positioning satellite system (GPS) 146, a hydraulic steering system 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor and be transformed (e.g., using parameters for one or more coordinate frame transformations) to be referenced to an absolute coordinate frame and/or a coordinate frame of mobile structure 101.

User interface 120 may be implemented as a display, a touch screen, a keyboard, a mouse, a joystick, a knob, a steering wheel, a ship's wheel or helm, a yolk, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine corrected steering actuator speeds and/or virtual rudder estimates, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or hydraulic steering system 150) over communication links formed by one or more associated logic devices, for example, and display sensor information corresponding to the received sensor or control signal to a user. In related embodiments, user interface 120 may be adapted to process sensor and/or control signals to determine sensor information. For example, a sensor signal may include a heading, an angular velocity, an acceleration, and/or a position of mobile structure 101. In such embodiment, user interface 120 may be adapted to process the sensor signals to determine sensor information indicating a motion compensated/stabilized linear acceleration, a roll, pitch, and/or yaw (orientation and/or rate), and/or a position of mobile structure 101, for example, and display the sensor information as feedback to a user. In one embodiment, user interface 120 may be adapted to display a time series of various sensor information and/or other parameters as part of or overlaid on a graph or map. For example, user interface 120 may be adapted to display a time series of positions of mobile structure 101 overlaid on a geographical map, which may include one or more graphs indicating a corresponding time series of virtual rudder estimates, pump control signals, and/or other sensor and/or control signals.

In some embodiments, user interface 120 may be adapted to accept user input including a user-defined target heading (e.g., a locked heading) for mobile structure 101, for example, and to generate control signals for hydraulic steering system 150 to cause mobile structure 101 to steer according to the target heading. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of hydraulic steering system 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for steering control (e.g., using hydraulic steering system 150) and/or performing other various operations of mobile structure 101 and/or system 100. In some embodiments, a control loop may include processing sensor signals and/or sensor information in order to control one or more operations of mobile structure 101 and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such a gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, and/or other device capable of measuring a linear speed of mobile structure 101 (e.g., in a surrounding medium and/or aligned with a longitudinal axis of mobile structure 101) and providing such measurements as sensor signals that may be communicated to various devices of system 100.

Gyroscope/accelerometer 144 may be implemented as one or more electronic sextants, semiconductor devices, integrated chips, accelerometer sensors, accelerometer sensor systems, or other devices capable of measuring linear accelerations and/or angular velocities/accelerations (e.g., direction and magnitude) of mobile structure 101 and providing such measurements as sensor signals that may be communicated to other devices of system 100 (e.g., user interface 114, controller 130). Gyroscope/accelerometer 144 may be positioned and/or adapted to make such measurements in relation to a particular coordinate frame of mobile structure 101, for example.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity of mobile structure 101 (e.g., using a time series of position measurements), such as an absolute velocity of mobile structure 101. In various embodiments, one or more logic devices of system 100 may be adapted to determine a speed of mobile structure 101 from such velocity.

Hydraulic steering system 150 may be adapted to physically adjust a heading of mobile structure 101 according to one or more control signals, user inputs, and/or a virtual rudder estimate provided by logic device of system 100, such as controller 130. Hydraulic steering system 150 may include one or more reversing pumps, pump controllers, hydraulic actuators (e.g., steering cylinders), and at least one control surface (e.g., a rudder or other type of steering mechanism) of mobile structure 101 physically coupled to at least one hydraulic actuator. In some embodiments, hydraulic system 150 may be adapted to physically adjust a control surface of mobile structure 101 to a variety of positive and/or negative steering angles/positions. Hydraulic steering system 150 is illustrated in more detail in FIGS. 2 and 3.

Propulsion system 170 may be implemented as a propeller, turbine, or other thrust-based propulsion system, and/or other types of propulsion systems that can be used to provide motive force to mobile structure 101. In some embodiments, propulsion system 170 may be non-articulated, for example, such that the direction of thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated and coupled to and/or integrated with hydraulic steering system 150, for example, such that the direction of generated thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), or an aircraft propeller or turbine with a variable thrust vector, for example. As noted herein, both articulated and non-articulated propulsion systems can produce an assisting force on a steering actuator of hydraulic steering system 150 that varies with thrust. Propulsion system 170 is illustrated in more detail in FIGS. 2 and 3.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 200 (e.g., controller 130) to provide operational control of mobile structure 101 that compensates for environmental conditions, such as wind speed and/or direction, swell speed, amplitude, and/or direction, and/or an object in a path of mobile structure 101, for example.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing hydraulic steering, for example, or for transmitting and/or receiving communications, such as sensor signals, sensor information, and/or control signals, between one or more devices of system 100. In one embodiment, such method may include instructions to determine reference direction 106, heading 107, and/or a yaw rate of mobile structure 101 from various sensor signals, to determine an elasticity estimate for hydraulic steering system 150, and/or to determine a virtual rudder estimate from the elasticity estimate and one or more sensor and/or control signals, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various measurements of magnetic fields and accelerations. For example, orientation sensor 140, gyroscope/accelerometer 144, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads.

In various embodiments, a logic device of system 100 (e.g., of orientation sensor 140, gyroscope/accelerometer 144, and/or other elements of system 100) may be adapted to determine parameters (e.g., using signals from various devices of system 100) for transforming a coordinate frame of orientation sensor 140 and/or gyroscope/accelerometer 144 to/from a coordinate frame of mobile structure 101, at-rest and/or in-motion, and/or other coordinate frames, as described herein. One or more logic devices of system 100 may be adapted to use such parameters to transform a coordinate frame of gyroscope/accelerometer 144 to/from a coordinate frame of orientation sensor 140 and/or mobile structure 101, for example. Furthermore, such parameters may be used to determine and/or calculate one or more adjustments to an orientation of gyroscope/accelerometer 144 that would be necessary to physically align a coordinate frame of gyroscope/accelerometer 144 with a coordinate frame of orientation sensor 140 and/or mobile structure 101. Adjustments determined from such parameters may be used to selectively power adjustment servos (e.g., of gyroscope/accelerometer 144 and/or other elements of system 100), for example, or may be communicated to a user through user interface 120, as described herein.

Figure 2:
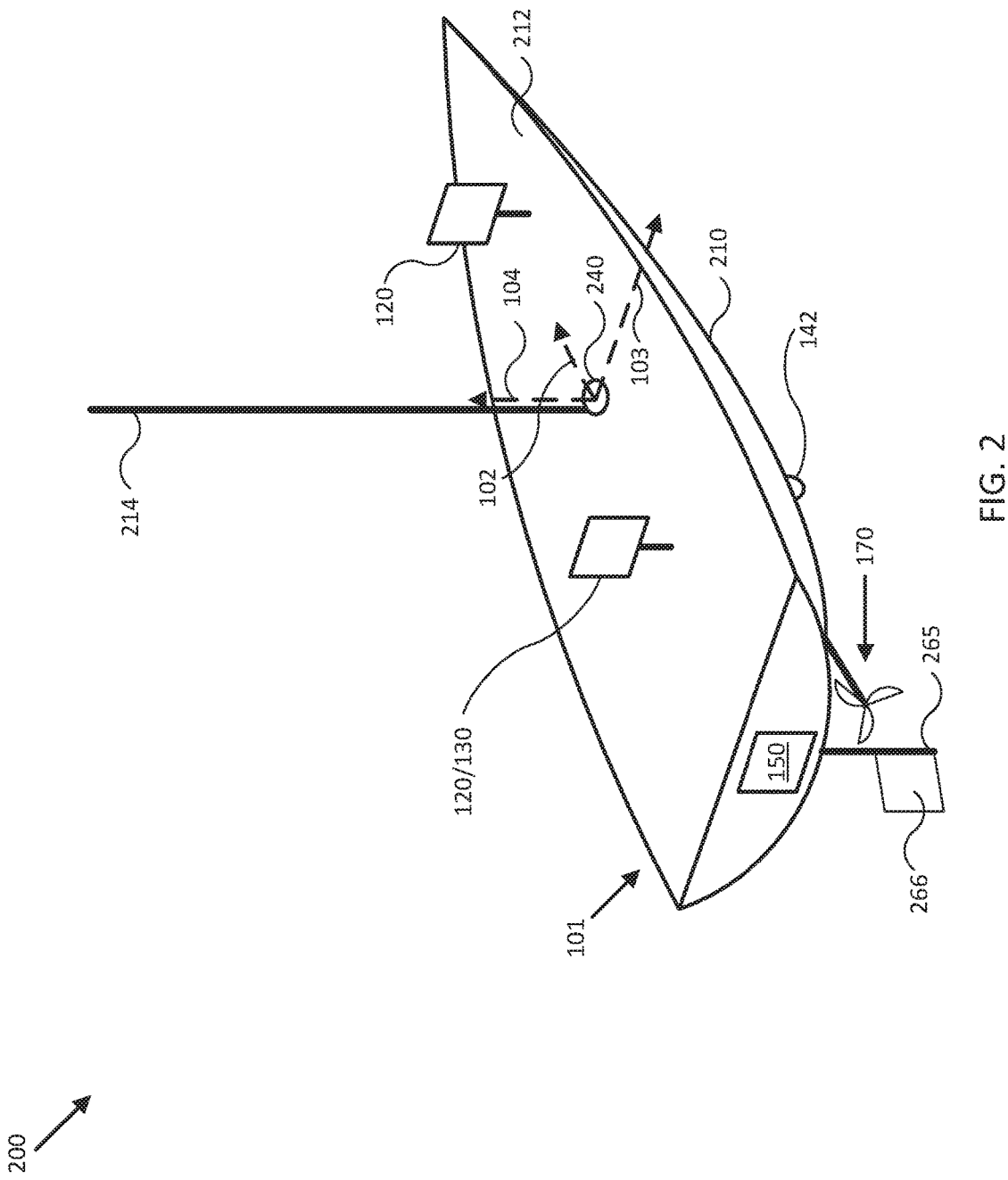
FIG. 2 illustrates a diagram of a hydraulic steering system in accordance with an embodiment of the disclosure.

FIG. 2 illustrates a diagram of a hydraulic steering system 200 in accordance with an embodiment of the disclosure. In the embodiment shown in FIG. 2, system 200 may be implemented to provide hydraulically actuated autopilot control for mobile structure 101, similar to system 100 of FIG. 1. For example, system 200 may include sensor cluster 240 (e.g., orientation sensor 140, gyroscope/accelerometer 144, GPS 146), user interface/controller 120/130, secondary user interface 120, hydraulic steering system 150, and various other sensors and/or actuators. In the embodiment illustrated by FIG. 2, mobile structure 101 is implemented as a motorized boat including a hull 210, a deck 212, a mast/sensor mount 214, a rudder post, a rudder 266, and inboard motor 170. In other embodiments, hull 210, deck 212, mast/sensor mount 214, rudder post 265, rudder 266, and inboard motor 170 may correspond to attributes of a passenger aircraft or other type of vehicle, robot, or drone, for example, such as an undercarriage, a passenger compartment, an engine/engine compartment, a trunk, a roof, a steering mechanism, and/or other portions of a vehicle.

As depicted in FIG. 2, mobile structure 101 includes rudder 266 that is coupled to hydraulic steering system 150 through rudder post 265 and non-articulated inboard motor 170 that is coupled directly to mobile structure 101. If inboard motor 170 produces propeller walk rotating mobile structure 101 counterclockwise (looking down on deck 212), rudder 266 experiences an assisting force from starboard to port such that turns to port are assisted. Counterclockwise rotations result in starboard turns being assisted. If motor 170 was instead mounted to rudder post 265, the propeller walk that produced counterclockwise rotation of mobile structure 101 when inboard would instead produce counterclockwise rotation of rudder post 265 and assist starboard turns. In some embodiments, controller 130 may be configured to determine both the magnitude and direction of an assisting force without user intervention/input (e.g., without knowledge of the type of propulsion system) and/or without a reference transducer/sensor, for example, by executing the various methods described herein.

In one embodiment, user interfaces 120 may be mounted to mobile structure 101 substantially on deck 212 and/or mast/sensor mount 214. Such mounts may be fixed, for example, or may include gimbals and other leveling mechanisms so that a display of user interfaces 120 stays substantially level with respect to a horizon and/or a "down" vector. In another embodiment, at least one of user interfaces 120 may be located in proximity to mobile structure 101 and be mobile throughout a user level (e.g., deck 212) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 2, in some embodiments, speed sensor 142 may be mounted to a portion of mobile structure 101 substantially below a typical user level, such as to hull 210, and be adapted to measure a relative water speed. Speed sensor 142 may be adapted to provide a thin profile to reduce and/or avoid water drag. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 210.

In the embodiment illustrated by FIG. 2, mobile structure 101 includes direction/longitudinal axis 102, direction/lateral axis 103, and direction/vertical axis 104 meeting approximately at mast/sensor mount 214 (e.g., near a center of gravity of mobile structure 101). In one embodiment, the various axes may define a coordinate frame of mobile structure 101 and/or sensor cluster 240. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 200 and/or mobile structure 101. Each element of system 200 may be located at positions different from those depicted in FIG. 2. Each device of system 200 may include one or more batteries or other electrical power storage devices, for example, and may include one or more solar cells or other electrical power generating devices. In some embodiments, one or more of the devices may be powered by a power source for mobile structure 101. As noted herein, each element of system 200 may be implemented with an antenna, a logic device, and/or other analog and/or digital components enabling that element to provide, receive, and process sensor signals and interface or communicate with one or more devices of system 200. Further, a logic device of that element may be adapted to perform any of the methods described herein.

Figure 3:
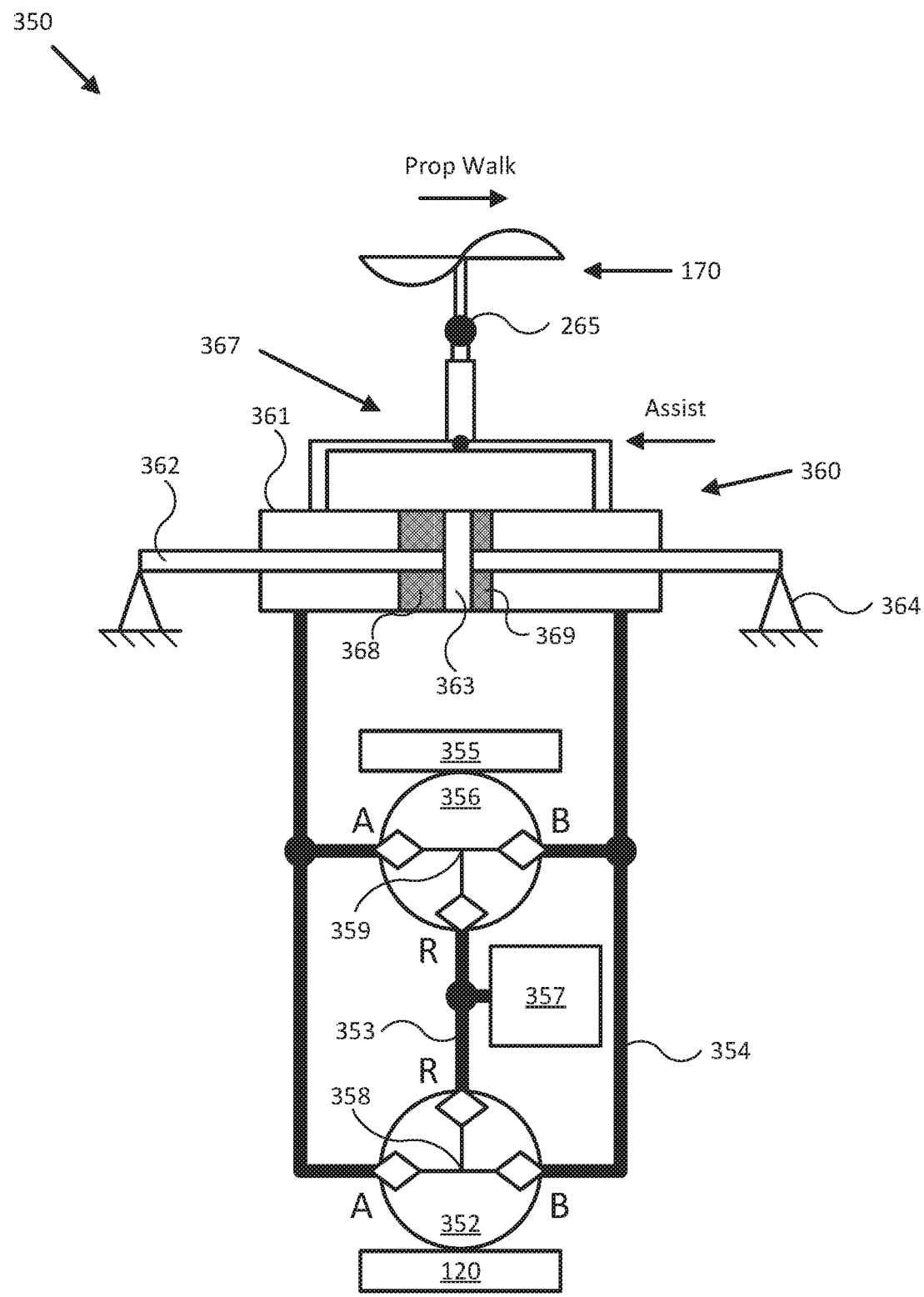
FIG. 3 illustrates a diagram of a hydraulic steering system in accordance with an embodiment of the disclosure.

FIG. 3 illustrates a diagram of hydraulic steering system 350 in accordance with an embodiment of the disclosure. In the embodiment shown in FIG. 3, system 350 may be implemented to provide hydraulically actuated autopilot control for a mobile structure, similar to system 150 of FIGS. 1 and 2. For example, system 350 may include user interface or helm 120 coupled to and controlling helm pump 352, pump controller 355 coupled to autopilot pump 356, and steering actuator/cylinder 360 coupled to helm pump 352 and autopilot pump 356 through supply lines 354. Helm 120 may be configured to operate helm pump 352 according to user input (e.g., manually turning a steering wheel or helm), for example, and pump controller 255 may be configured to operate autopilot pump 356 according to pump control signals (e.g., provided by controller 130 of FIG. 1). Steering cylinder 360 may be coupled to articulated propulsion system 170 through tiller assembly 367 and rudder post 265, such that motion of cylinder body 361 from right to left on the page results in propulsion system 170 rotating clockwise.

As shown in FIG. 3, steering actuator 360 is implemented as a balanced hydraulic actuator, where cylinder rod 362 extends all the way through cylinder body 361 and there is no volume or area imbalance when pumping fluid into either end of cylinder body 361. In other embodiments, steering actuator 360 may be implemented as an unbalanced hydraulic actuator, where cylinder rod 362 extends from sliding seal 363 through only one end of cylinder body 361. Also shown are anchors 364, which may be configured to anchor cylinder rod 362, provide firm actuation through movement of cylinder body 361, and/or act as port and starboard end stops limiting motion of cylinder body 361 and steering actuator 360, thereby limiting motion of propulsion system 170.

Although a particular configuration of steering actuator, tiller assembly, and control surface are depicted in FIG. 3, system 350 may be implemented with a variety of different configurations and/or combinations of configurations, including where propulsion system 170 is replaced with a rudder, for example, or cylinder body 361 is anchored and cylinder rod 362 is coupled to rudder post 265. Also, in some embodiments, additional helm and/or other pumps may be coupled in parallel to system 350 without substantially altering operation of system 350.

Pumps 352 and 356 may be implemented as conventional manual and/or motorized hydraulic pumps with respective check valve assemblies 358 and 359 that allow the pumps to be refilled from the low pressure side and/or reservoir 357 when pumping fluid out of the high pressure side, but do not allow fluid to enter or exit a pump unless the pump is actively pumping and creating a sufficient pressure differential. Thus, pumps 352 and 356 are functionally decoupled from each other and do not force each other to rotate when only one pump is operated.

Pump controller 355 may be implemented as one or more power switching circuits (e.g., power transistors, relays, and/or other power switching circuits), motor sensors, and/or logic devices that can operate autopilot pump 356 according to various pump control signals (e.g., PWMs) indicating a target motor speed, direction, and duration, that can sense a supply voltage, a terminal voltage, and an actual motor speed, and/or that can determine a back EMF and/or a motor load of autopilot pump 356, as described herein. In some embodiments, pump controller 355 may be configured to communicate with an external controller (e.g., controller 130 of FIG. 1) and receive pump control signals indicating direction, duration, and/or amplitude of pump control signals to be provided to a motor for autopilot pump 356. Motor sensors of pump controller 355 may include one or more current sensors, voltage sensors, RPM sensors, temperature sensors, and/or other motor sensors, for example, and can be referenced to various terminals of a pump motor including individual winding terminals. As noted herein, each element of system 350, and particularly pump controller 355, may be implemented with an antenna, a logic device, and/or other analog and/or digital components enabling that element to provide, receive, and process sensor signals and interface or communicate with one or more devices of system 350 and systems 100 and/or 200 of FIGS. 1 and 2. Further, a logic device of that element may be adapted to perform any of the methods described herein.

Also shown in FIG. 3 are the direction of propeller walk (left to right), the resulting assisting force (right to left on cylinder body 361), and the resulting expanded air volume 368 and compressed air volume 369. In the configuration shown in FIG. 3, pumping fluid into the B side of the system acts against the assisting force, and pumping fluid into the A side of the system acts with the assisting force.

When pumping fluid into the B side of system 350, steering actuator 360 may produce a response that can be reliably estimated by determining the corresponding linear steering actuator speed (e.g., rudder speed) from the applicable linear hydraulic slip contributions (e.g., the load and speed based linear slip rate and any system directional imbalance linear slip rate) that may be derived from pump control signals provided to autopilot pump 356 and/or pump sensor signals indicating supply voltage, back EMF, and/or pump speed. In some embodiments, the load and speed based linear slip rate of autopilot pump 356 is substantially constant over the steering actuator positions and operations caused by pump controller 355, regardless of a speed of the mobile structure and/or assisting forces on steering actuator 360. In such embodiments, the linear steering actuator speed may be derived from pump control signals.

When pumping fluid into the A side of system 350, steering actuator 360 may produce a response that can be reliably estimated by determining the corresponding linear steering actuator speed, estimating the elasticity of system 350 that may depend partially on a measured yaw rate of a coupled mobile structure (e.g., from gyroscope/accelerometer 144 of FIG. 1), and then determining a corrected linear steering actuator speed from the estimated elasticity and the linear steering actuator speed, as described herein. In some embodiments, the linear steering actuator speed may be properly corrected using the estimated elasticity by ratcheting the response of the estimated elasticity in accordance with the action of check valve assembly 359, as described herein. For example, a controller (e.g., controller 130) may be configured to determine a ratchet balancing component based on a pump control signal (e.g., provided by pump controller 355) and the elasticity estimate, where the ratchet balancing component corresponds to an expansion and/or compression of a volume of air in system 350 that is approximately equal to the magnitude of the elasticity estimate, the expansion takes place over a relatively short period of time, the compression takes place over a relatively long period of time, and the various periods of time correspond roughly to the actual elasticity response in system 350. As such, the ratchet balancing component may be configured to compensate for the elastic response of system 350 to one or more pump control signals provided by pump controller 355.

In various embodiments, the estimated elasticity of system 350 may be adaptive with respect to a measured response of system 350 and a coupled mobile structure. For example, a controller may be configured to determine a virtual rudder error from a prior virtual rudder (e.g., derived from a prior elasticity estimate) and, in some embodiments, a yaw rate of the coupled mobile structure. In such embodiments, the elasticity estimate may be determined from the virtual rudder error and the measured yaw rate, which helps drive the elasticity estimate towards a value that is reliably representative of the response of system 350.

Figure 4A:
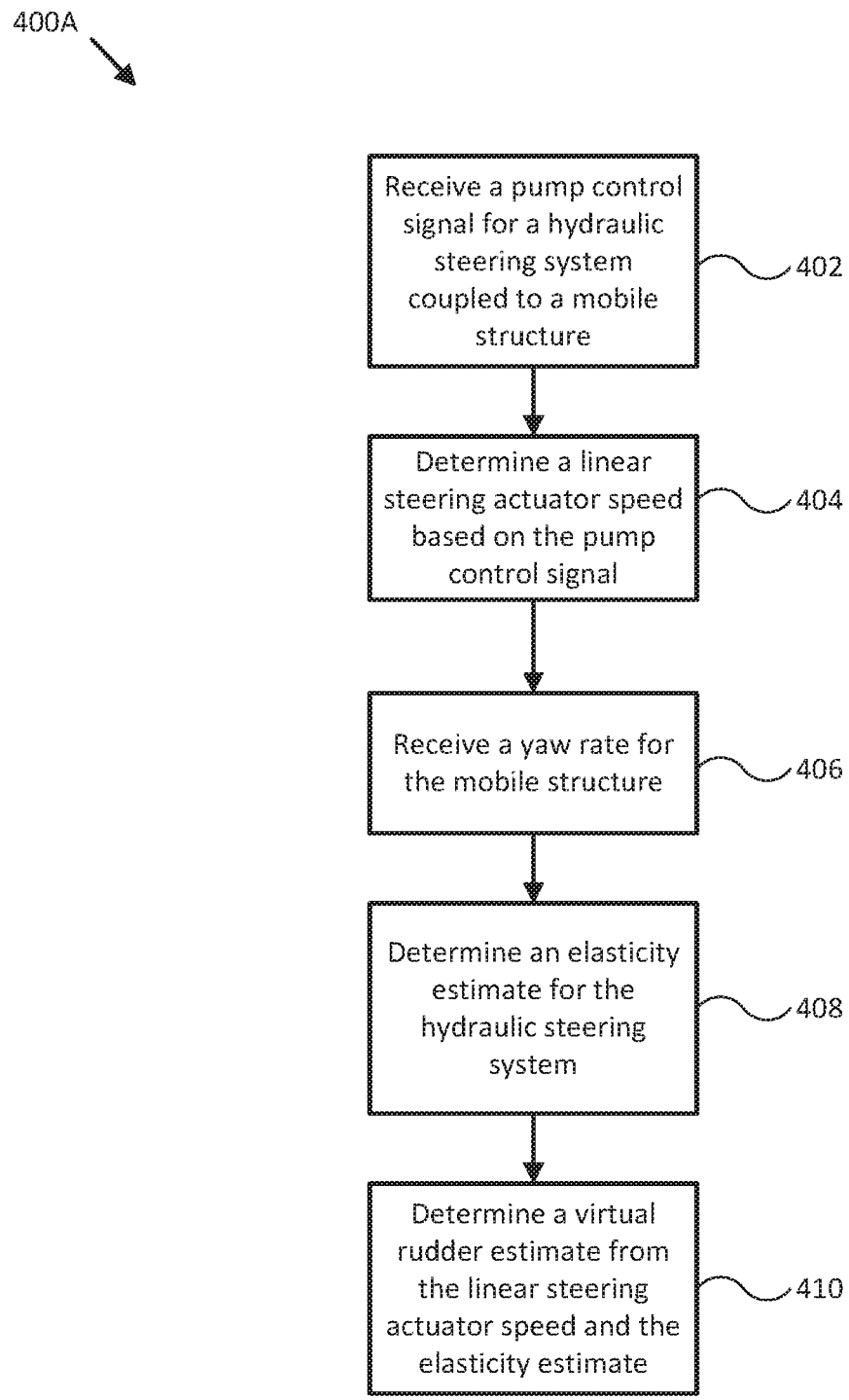
FIGS. 4A-4B illustrate flow diagrams of various operations to provide hydraulic steering in accordance with embodiments of the disclosure.
Figure 4B:
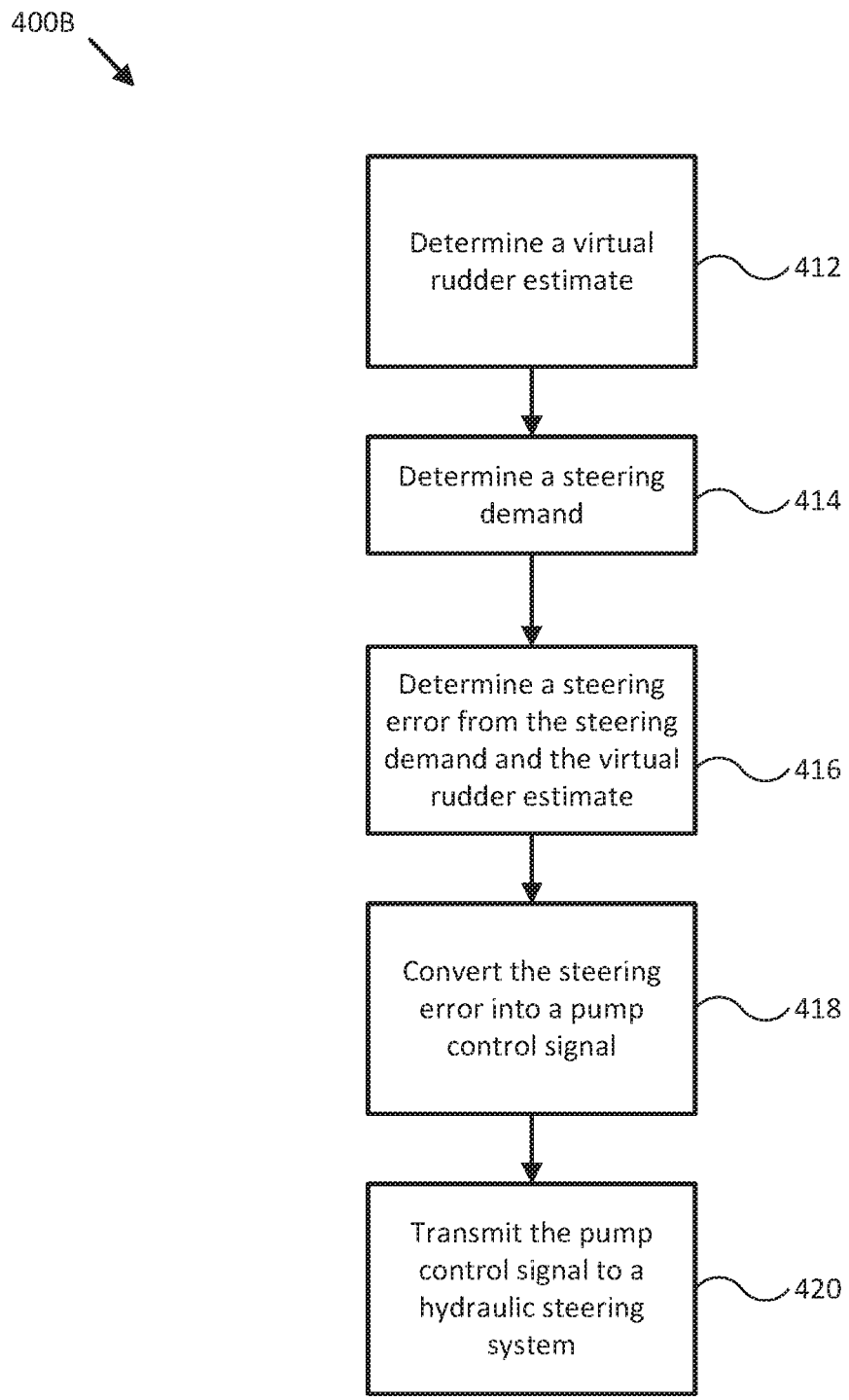

FIGS. 4A-B illustrate flow diagrams of respective processes 400A and 400B to provide hydraulic steering for mobile structure 101 in accordance with embodiments of the disclosure. In some embodiments, the operations of FIGS. 4A-B may be implemented as software instructions executed by one or more logic devices associated with corresponding electronic devices and/or sensors of system 100 of FIG. 1, system 200 of FIG. 2, and/or system 350 of FIG. 3. More generally, the operations of FIGS. 4A-B may be implemented with any combination of software instructions and/or electronic hardware (e.g., inductors, capacitors, amplifiers, or other analog and/or digital components).

It should be appreciated that any step, sub-step, sub-process, or block of processes 400A and 400B may be performed in an order or arrangement different from the embodiments illustrated by respective FIGS. 4A-B. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories of systems 100, 200, and/or 350 prior to moving to a following portion of a corresponding process. Although processes 400A and 400B are described with reference to systems 100, 200, and 350, processes 400A and 400B may be performed by other systems different from systems 100, 200, and 350 and including a different selection of electronic devices, sensors, mobile structures, and/or mobile structure attributes.

Process 400A represents a method for providing hydraulic steering for mobile structure 101 using hydraulic steering systems 150 and/or 350 in accordance with embodiments of the disclosure. At the initiation of process 400A, the various contributions to the linear hydraulic slip of systems 150/350 have been characterized through user input and/or through one or more dockside setup processes performed by one or more of systems 100, 200, and/or 350, as described herein.

In block 402, a logic device receives a pump control signal for a hydraulic steering system coupled to a mobile structure. For example, controller 130 may be configured to receive a pump control signal (e.g., one or more control signals indicating PWMs provided to autopilot pump 356) from pump controller 355 of hydraulic steering system 350, where hydraulic steering system 350 may be coupled to mobile structure 101. In some embodiments, controller 130 may also be configured to receive one or more pump sensor signals from pump controller 355.

In block 404, a logic device determines a linear steering actuator speed based on a pump control signal. For example, controller 130 may be configured to determine a linear rudder speed from one or more pump control signals received in block 402 indicating a pump motor load, speed, and/or direction. In some embodiments, pump motor loads and/or speeds may be derived from a pump control signal alone using a pump and/or steering system characterization (e.g., determined during a dockside characterization process) linking one or more control signal attributes to pump loads and/or speeds. In embodiments where the linear rudder speed cannot be reliably determined from the pump control signals alone, controller 130 may be configured to determine the linear rudder speed from one or more pump control signals, pump sensor signals, and/or a linear balancing coefficient for hydraulic steering system 350. In various embodiments, the linear balancing coefficient comprises a ratio of integrated back EMFs derived from orthogonal full stroke drives of steering actuator 360.

In optional block 406, a logic device receives a yaw rate for a mobile structure. For example, controller 130 may be configured to receive a measured yaw rate of mobile structure 101 from gyroscope/accelerometer 144. In some embodiments, controller 130 may be configured to receive a time series of measured headings of mobile structure 101 from orientation sensor 140, for example, and calculate a yaw rate from the time series of measured headings.

In block 408, a logic device determines an elasticity estimate for a hydraulic steering system. For example, controller 130 may be configured to determine an elasticity estimate for hydraulic steering system 350 by first determining a virtual rudder error based on and/or equal to a prior virtual rudder estimate (e.g., initially zero), and then accumulating (e.g., integrating) the virtual rudder error over time. In other embodiments, controller 130 may be configured to determine an elasticity estimate for hydraulic steering system 350 from the yaw rate received in block 406. For example, controller 130 may be configured to determine the elasticity estimate by accumulating (e.g., integrating) the yaw rate and/or a scaled yaw rate over time. In one embodiment, the "scaled yaw rate" may be defined as the steering/rudder angle/position (e.g., represented in degrees) that substantially produces the corresponding yaw rate for mobile structure 101. For example, operation of hydraulic steering system 350 may be characterized with a particular mobile structure 101 (e.g., using variable steering inputs, user inputs, manufacturer supplied parameters, and/or other characterization processes executed by controller 130) so that a measured yaw rate of mobile structure 101 may be converted to a corresponding steering angle/position (e.g., position of steering actuator 360) using the characterization, which may take the form of a scaling factor, a lookup table, an arithmetic function of the yaw rate, and/or other conversion techniques.

In various embodiments, controller 130 may be configured to determine the elasticity estimate by first determining a virtual rudder error based on the difference between a prior virtual rudder estimate and the scaled yaw rate, and then accumulating (e.g., integrating) the virtual rudder error over time. In further embodiments, controller 130 may be configured to determine the elasticity estimate by accumulating (e.g., integrating) a phase advance compensated virtual rudder error comprising the sum of the virtual rudder error and a filtered derivative of the virtual rudder error. In still further embodiments, controller 130 may be configured to determine the elasticity estimate by receiving the elasticity estimate as user input from a user interface and/or by retrieving the elasticity estimate from a machine readable medium. It is contemplated that any one or combination of methods to determine the elasticity estimate may be performed according to one or more operating contexts of a control loop, for example, such as a startup, learning, running, and/or other type operating context.

In order to limit accumulation of errors in the elasticity estimate, controller 130 may be configured to update the elasticity estimate (e.g., accumulate or integrate a non-zero virtual rudder error) only at particular times during operation of hydraulic steering system 350, for example. In some embodiments, controller 130 may be configured to update the elasticity estimate only when mobile structure 101 is not experiencing a relatively large heading change. In other embodiments, controller 130 may be configured to update the elasticity estimate only a limited number of times during a pump operation cycle (e.g., once or twice or a few times per pulse duration of a PWM pump control signal). For example, controller 130 may be configured to update the elasticity estimate near startup and/or shutdown of autopilot pump 356 (e.g., near leading and trailing edges of a pulse control signal).

In one embodiment, controller 130 may be configured to detect that hydraulic steering system 350 is in a non-accumulation cycle and block updates of the elasticity estimate, for example. As used herein, a non-accumulation cycle may be defined as any state of hydraulic steering system 350 and/or mobile structure 101 where input(s) to the elasticity estimate are set to zero so as to limit a risk of accumulating errors in the elasticity estimate. In one embodiment, a non-accumulation cycle may be defined programmatically as where the present pump control signal (e.g., the pump control signal received in block 402) is any value (e.g., zero or non-zero), and the immediately preceding pump control signal (e.g., stored in memory) is non-zero. In such an embodiment, all operation cycles other than a startup cycle (e.g., a leading edge of a pump control signal) are non-accumulation errors. For example, controller 130 may be configured to set the yaw rate and/or the virtual rudder error to zero before determining the elasticity estimate and while hydraulic steering system 350 is in a non-accumulation cycle, as determined by the pump control signal. Controller 130 may also be adapted to taper the virtual rudder error prior to determining the elasticity estimate to reduce a risk of excursion of steering actuator 360 (e.g., where steering actuator 360 works against end stops of system 350).

In block 410, a logic device determines a virtual rudder estimate from a linear steering actuator speed and an elasticity estimate. For example, controller 130 may be configured to determine a virtual rudder estimate for hydraulic steering system 350 from a corrected rudder speed, where the corrected rudder speed is based, at least in part, on the pump control signal received in block 402, the linear rudder speed determined in block 404, and/or the elasticity estimate determined in block 408. In one embodiment, the corrected rudder speed may be additionally based on a bleed balancing component comprising the virtual rudder error determined in block 408 scaled by a proper fraction with a value less than one-half, such as $1/5$, $1/10$, $1/20$, $1/30$, $1/40$, and/or $1/50$, for example, and that may be equal to zero when mobile structure 101 is experiencing a relatively large heading change and/or when hydraulic system 350 is in a non-accumulation cycle.

In various embodiments, controller 130 may be configured to determine the corrected rudder speed based, at least in part, on the linear rudder speed and/or a ratchet balancing component, where the ratchet balancing component is configured to compensate for an elastic response of hydraulic steering system 350 to the pump control signal received in block 402. For example, controller 130 may be configured to determine the ratchet balancing component based on the pump control signal received in block 402 and the elasticity estimate determined in block 408, where the pump control signal is used to ratchet or modulate the effect of the elasticity estimate in accordance with the response of check valve assembly 359 to actual elasticity in system 350, as described herein.

Controller 130 may be configured to determine the virtual rudder estimate, once the corrected rudder speed is determined, by accumulating (e.g., integrating) the corrected rudder speed over time. In some embodiments, the virtual rudder estimate may be used (e.g., with an updated yaw rate) to determine an updated virtual rudder error, which in turn may be used to update the elasticity estimate, the bleed balancing component, the corrected rudder speed, and eventually the virtual rudder estimate, as in a control loop. In embodiments where the virtual rudder error is used to estimate the elasticity of system 350, the elasticity estimate is adaptive to the characteristics of system 350 and changes in those characteristics over time, thereby reducing a need for user input/intervention in conforming the virtual rudder estimate to actual positioning of system 350.

Process 400B represents a method for providing hydraulic steering for mobile structure 101 using hydraulic steering systems 150 and/or 350 in accordance with embodiments of the disclosure. At the initiation of process 400B, the various contributions to the linear hydraulic slip of systems 150/350 have been characterized through user input and/or through one or more dockside setup processes performed by one or more of systems 100, 200, and/or 350, as described herein.

In block 412, a logic device determines a virtual rudder estimate. Block 412 is substantially similar to process 400A of FIG. 4A and can be performed similarly.

In block 414, a logic device determines a steering demand. For example, controller 130 may be configured to receive a target heading from user interface 120 and a measured heading for mobile structure 101 from orientation sensor 140, and controller 130 may be configured to determine the steering demand (e.g., rudder demand) based on the steering angle or angles required to substantially align the received heading of mobile structure 101 with the received target heading. In one embodiment, controller 130 may be configured to chart a course according to one or more steering angles and or linear speeds of mobile structure 101 so as to align mobile structure 101 with the target heading over time and without risk of excursion of steering actuator 360. In such embodiment, controller 130 may be configured to determine the steering demand and/or a propulsion system thrust according to the charted course. In another embodiment, controller 130 may be configured determine a steering demand by subtracting the measured heading from the target heading. In yet another embodiment, controller 130 may be configured to receive a rudder demand directly from user interface 120.

In block 416, a logic device determines a steering error from a steering demand and a virtual rudder estimate. For example, controller 130 may be configured to determine a steering error (e.g., a rudder error) from the steering demand (e.g., a rudder demand) determined in block 414 and the virtual rudder estimate determined in block 412 by subtracting the two values.

In block 418, a logic device converts a steering error into a pump control signal. For example, controller 130 may be configured to convert the steering error (e.g., a rudder error) determined in block 416 into a pump control signal (e.g., one or more PWMs) for use with pump controller 355. In some embodiments, controller 130 may be configured to convert the steering error into a pump control signal using a conversion that does not account for hydraulic slip. In such embodiments, the virtual rudder estimate determined in block 412 adaptively compensates for hydraulic slip so that the conversion of the steering error eventually produces a reliable and accurate steering angle/position.

In various embodiments, controller 130 may be configured to quantize the steering error according to a selected one of a plurality of quantization levels prior to converting the quantized steering error into the pump control signal. For example, controller 130 may be configured to receive a quantization level selection from user interface 120, for example, and then conform the steering error to the selected quantization level (e.g., rounding the steering error to the nearest quantization level). In some embodiments, controller 130 may be adapted to apply a trailing deadband (e.g., a model of backlash) to the steering error prior to quantizing the steering error, where the trailing deadband has a width that varies with the selected quantization level.

In block 420, a logic device transmits a pump control signal to a hydraulic steering system. For example, controller 130 may be configured to transmit the pump control signal generated in block 418 to pump controller 355 of hydraulic steering system 350. The pump control signal may then be used to energize autopilot pump 356 and cause steering actuator 360 to impart a steering angle to hydraulic steering system 350, which in turn may produce a yaw rate for coupled mobile structure 101. The pump control signal and the yaw rate may be fed back into block 412 to update the virtual rudder estimate, the steering demand may be updated from an updated measured heading and/or target heading, the steering error may be updated from the updated steering demand and virtual rudder estimate, the updated steering error may be converted into an updated pump control signal, which may eventually be transmitted to hydraulic steering system 350, as in a control loop.

Embodiments of the present disclosure can thus reliably hydraulically steer a mobile structure using one or more hydraulic pump control signals and, in some embodiments, a measured or calculated yaw rate of the mobile structure. Such embodiments may be used to safely autopilot a mobile structure without the additional cost and maintenance typically required by conventional systems that rely on a relatively fragile control surface reference transducer/sensor as feedback to an autopilot controller.

It should be appreciated that processes 400A and 400B may be adapted to control various types of hydraulic systems providing movement of various types of control surfaces/actuators. Thus, in some embodiments, the term "hydraulic steering system" may refer generically to a system for actuating any type of moveable structure, such as a crane boom of a crane (e.g., a hydraulic actuating system). Moreover, the term "rudder" may refer to a control surface for a watercraft or aircraft, for example, and may additionally generically refer to an actuator, such as actuator 360. As such, a "rudder estimate" may refer to an estimated angular position of a coupled control surface, such as rudder 266 and/or propulsion system 170, for example, and may additionally generically refer to an estimated position of an actuator itself, such as actuator 360 (e.g., a lineal position/offset of cylinder body 361 relative to cylinder rod 362 and/or anchor(s) 364—an actuator estimate). Likewise, "rudder speed" may refer generically to a rate of change of a position of an actuator (e.g., an actuator speed), "rudder error" may refer generically to an error in the actuator/rudder estimate (e.g., an actuator error), "rudder demand" may refer generically to a desired position of an actuator (e.g., an "actuator demand"), and a "target heading" may refer generically to a desired absolute position of a mobile structure.

FIGS. 5A-9 illustrate flow diagrams and/or control loops of respective processes 500A-900 to provide hydraulic steering for mobile structure 101 in accordance with embodiments of the disclosure. In some embodiments, the operations of FIGS. 5A-9 may be implemented as software instructions executed by one or more logic devices associated with corresponding electronic devices and/or sensors of system 100 of FIG. 1, system 200 of FIG. 2, and/or system 350 of FIG. 3. More generally, the operations of FIGS. 4A-B may be implemented with any combination of software instructions and/or electronic hardware (e.g., inductors, capacitors, amplifiers, or other analog and/or digital components).

It should be appreciated that any step, sub-step, sub-process, or block of processes 500A-900 may be performed in an order or arrangement different from the embodiments illustrated by respective FIGS. 5A-9. For example, in other embodiments, one or more blocks and/or elements may be omitted from the various processes, and blocks and/or elements from one process may be included in another process. Furthermore, inputs, outputs, various sensor signals, sensor information, calibration parameters, and/or other operational parameters, constants, state variables or other information may be stored to one or more memories of systems 100 200, and/or 350 prior to moving to a following portion of a corresponding process. Although processes 500A-900 are described with reference to systems 100, 200, and 350, processes 500A-900 may be performed by other systems different from systems 100, 200, and 350 and including a different selection of electronic devices, sensors, mobile structures, and/or mobile structure attributes.

Figure 5A:
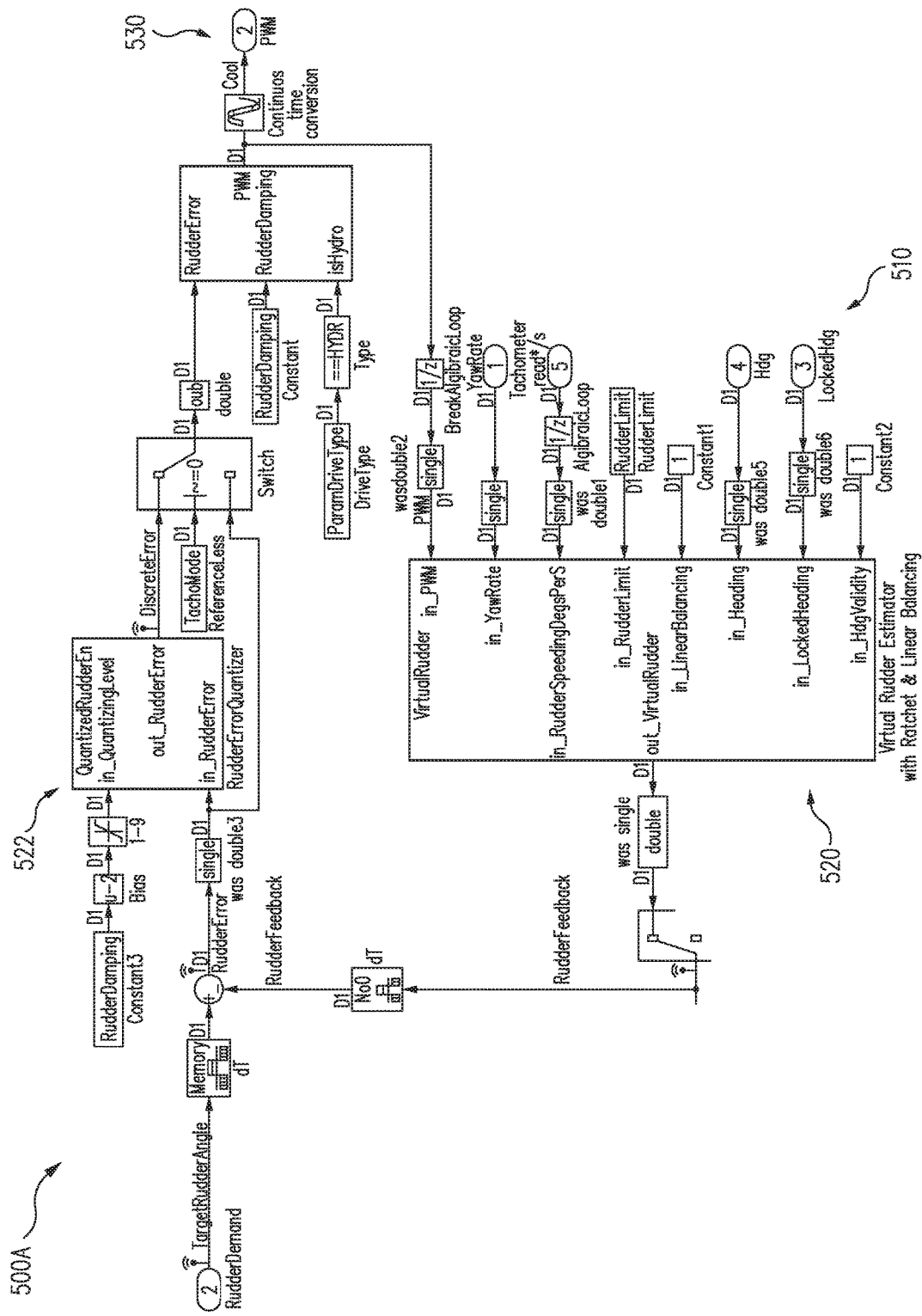
FIG. 5A illustrates flow diagrams of various control loops and other operations to provide hydraulic steering in accordance with embodiments of the disclosure.

Process 500A of FIG. 5A illustrates an embodiment of a top level view of a process to provide hydraulic steering. In some embodiments, process 500A may include sensor inputs 510 (e.g., from orientation sensor 140, speed sensor 142, gyroscope/accelerometer 144, and/or user interface 120), virtual rudder estimator logic block 520 (e.g., expanded upon in FIGS. 6A-6B), quantizer logic block 522 (e.g., expanded upon in FIG. 5E), outputs 530 (e.g., a pump control signal), and/or various filters, switching blocks, and math function blocks, as shown.

Figure 5B:
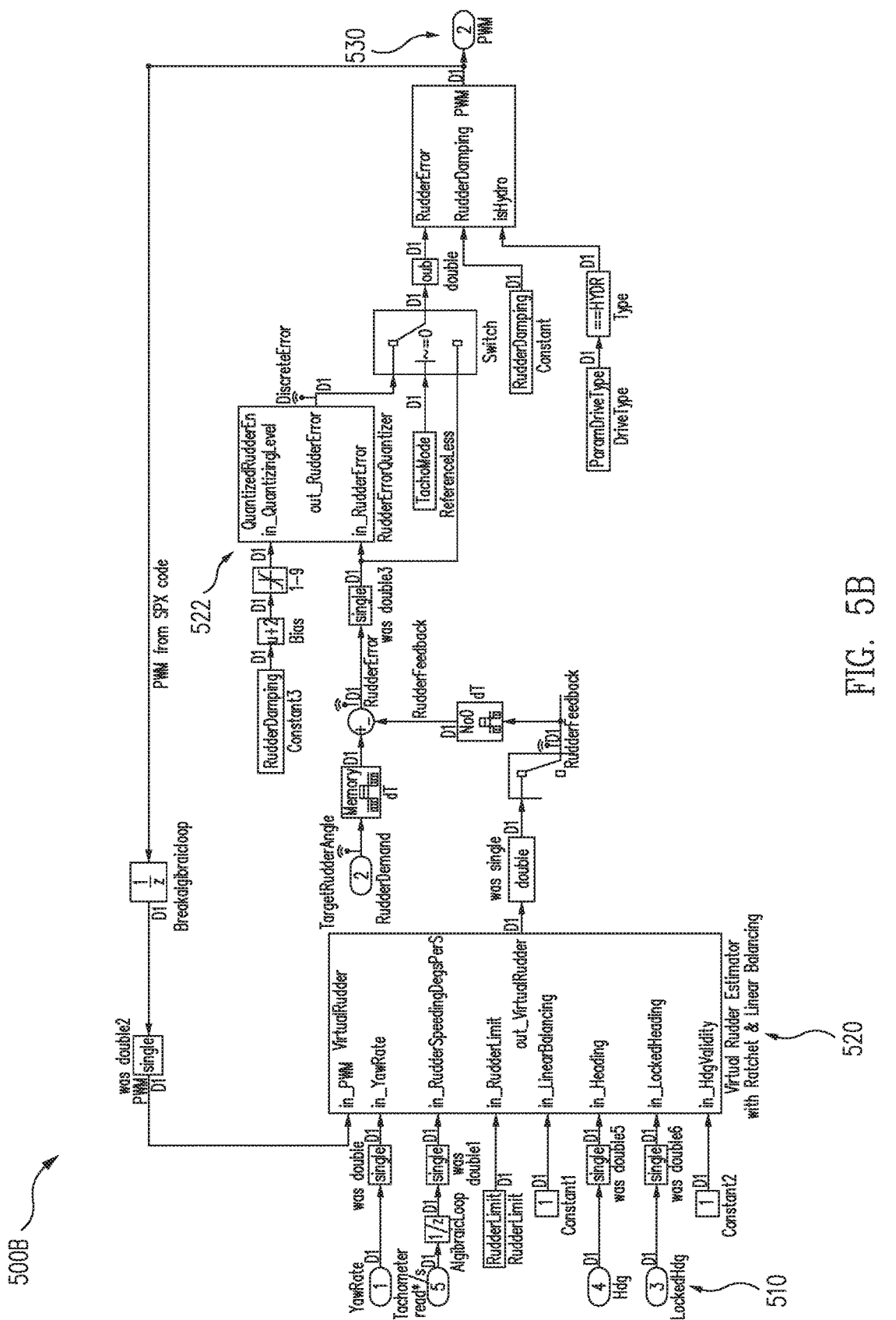
FIG. 5B illustrates flow diagrams of various control loops and other operations to provide hydraulic steering in accordance with embodiments of the disclosure.

Process 500B of FIG. 5B illustrates an embodiment of a top level view of a process to provide hydraulic steering. In some embodiments, process 500B may include sensor inputs 510 (e.g., from orientation sensor 140, speed sensor 142, gyroscope/accelerometer 144, and/or user interface 120), virtual rudder estimator logic block 520 (e.g., expanded upon in FIGS. 6A-6B), quantizer logic block 522 (e.g., expanded upon in FIG. 5E), outputs 530 (e.g., a pump control signal), and/or various filters, switching blocks, and math function blocks, as shown.

Figure 5C:
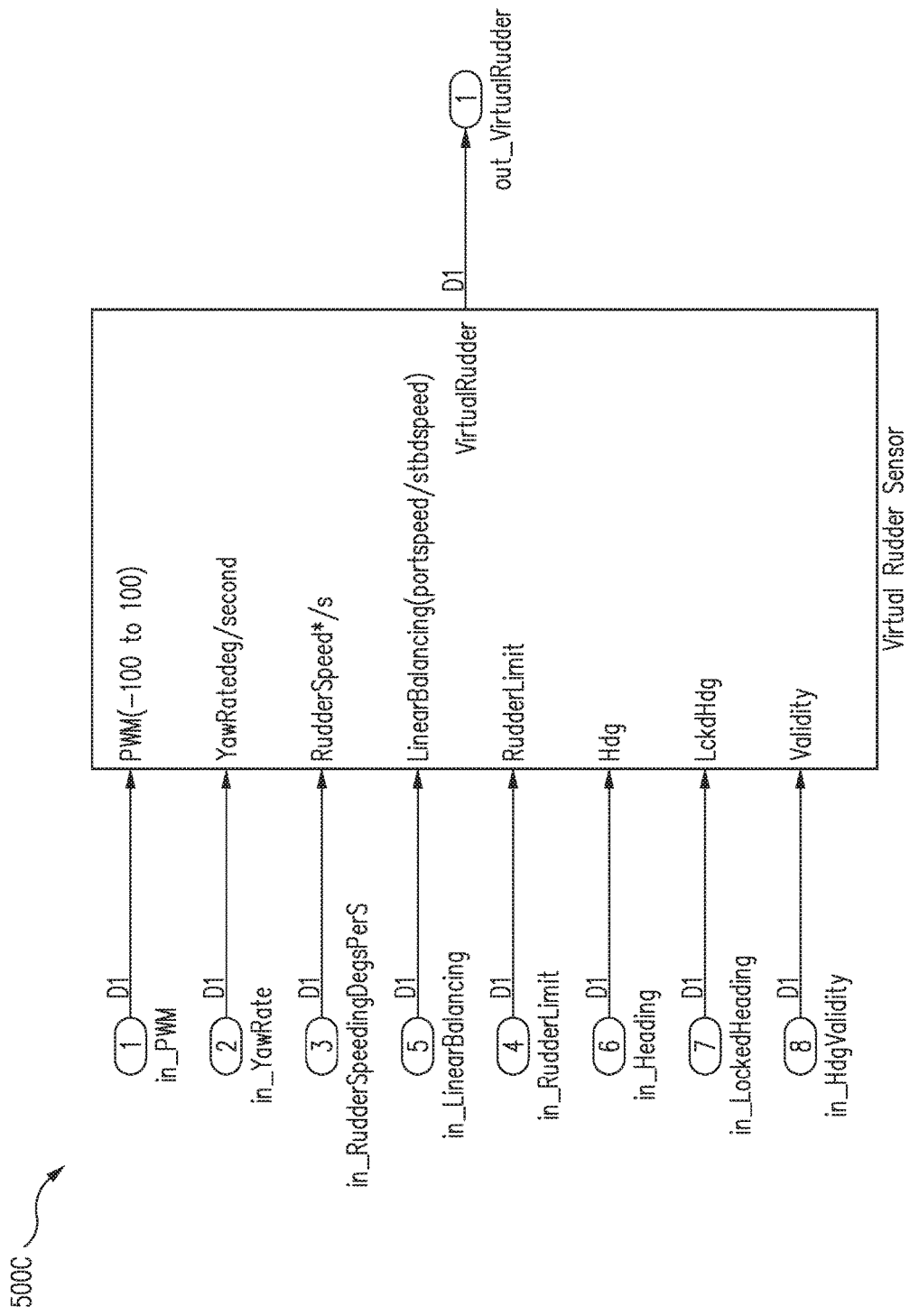
FIG. 5C illustrates flow diagrams of various control loops and other operations to provide hydraulic steering in accordance with embodiments of the disclosure.

Process 500C of FIG. 5C illustrates an embodiment of virtual rudder estimator logic block 520 (e.g., expanded upon in FIGS. 6A-6B) of FIGS. 5A and 5B.

Figure 5D:
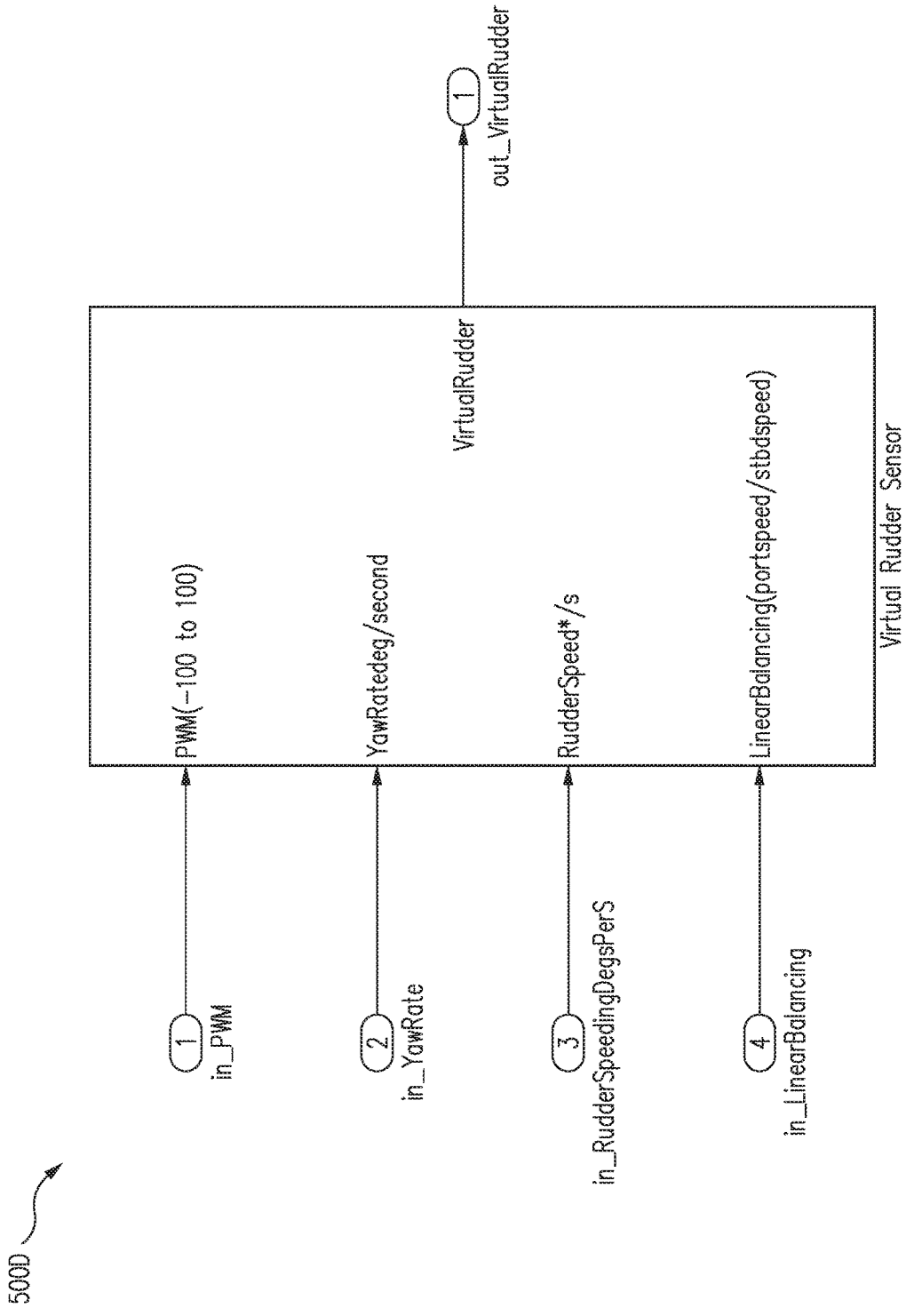
FIG. 5D illustrates flow diagrams of various control loops and other operations to provide hydraulic steering in accordance with embodiments of the disclosure.

Process 500D of FIG. 5D illustrates an embodiment of virtual rudder estimator logic block 520 (e.g., expanded upon in FIGS. 6A-6B) of FIGS. 5A and 5B.

Figure 5E:
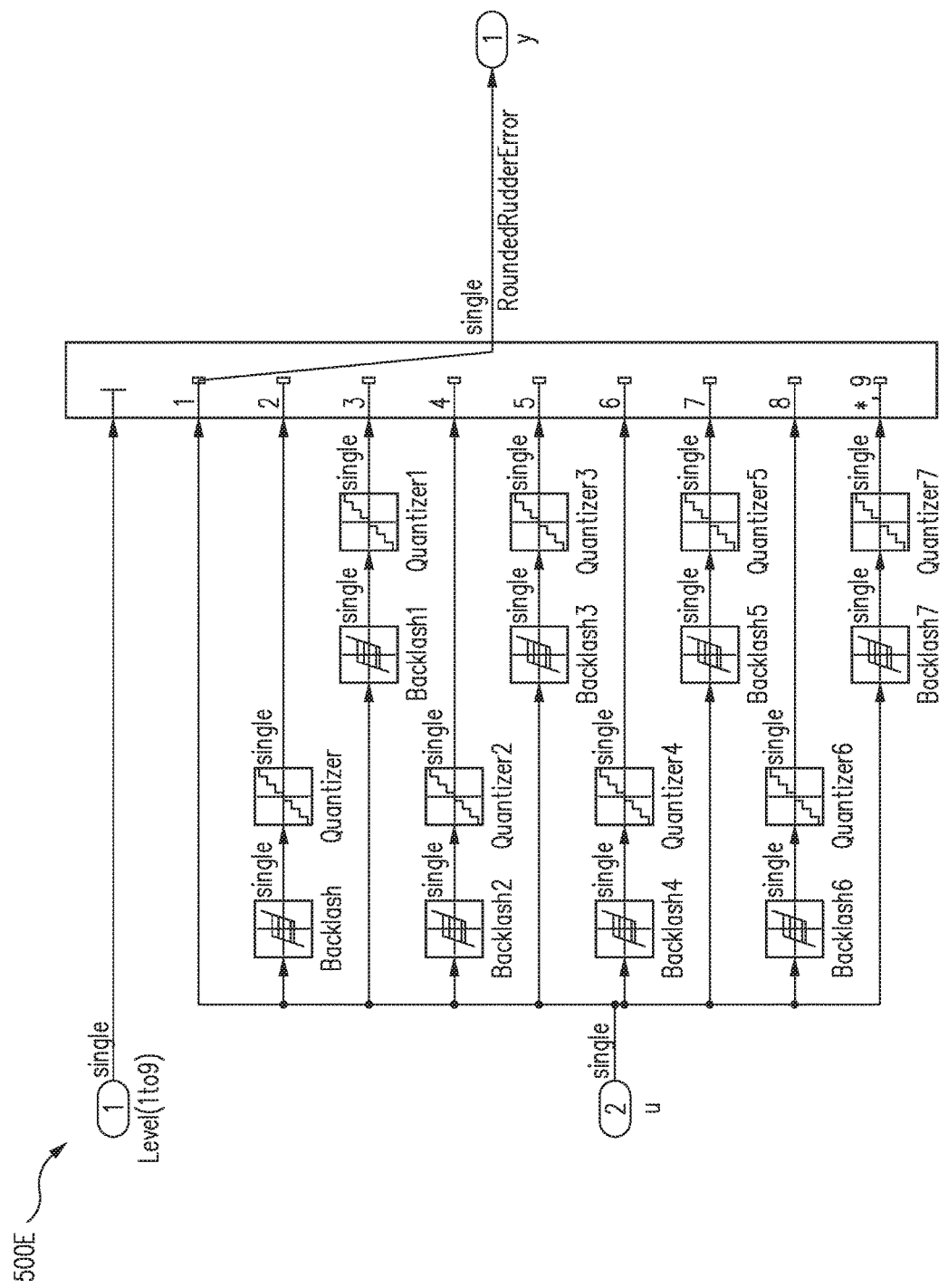
FIG. 5E illustrates flow diagrams of various control loops and other operations to provide hydraulic steering in accordance with embodiments of the disclosure.

Process 500E of FIG. 5E illustrates an embodiment of quantizer logic block 522 of FIGS. 5A and 5B.

Ratchet balancing is an approximation to the real world effect of elasticity under assisted load. To minimize errors in the approximation, it is desirable to keep motor drive cycles as steady as possible. Rapid microbursts (drive bursts less than 200 ms) should be avoided. There are many possible ways to manage a steering control loop to keep drive cycles steady, and the example herein uses quantizer logic block 522.

The rudder error (e.g., in FIGS. 5A-B) may be computed by subtracting the virtual rudder estimate from the rudder demand, and this may be quantized before passing it to a motor controller. Quantizer logic block 522 can be applied with different levels of granularity. A typical level could be 0.8° because a typical rudder drive speed of 3°/s implies a pulse length of 266 ms, which is not too short, but gives reasonable angular control resolution. The offset of 2 is applied in the diagram because the rudder damping default is 3 and the multiport switch in quantizer logic block 522 has quantization steps of 0.2°.

Figure 6A:
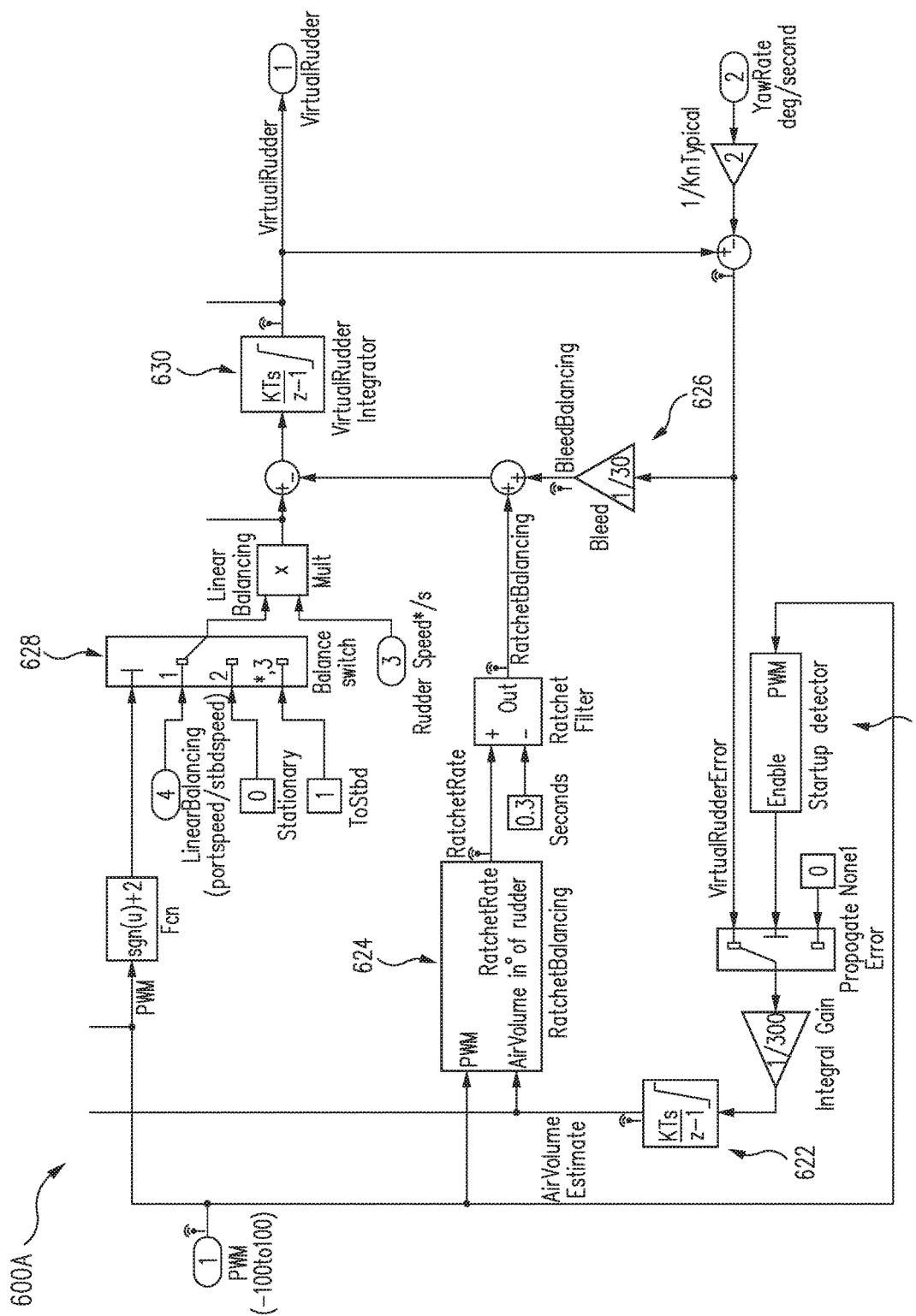
FIG. 6A illustrates flow diagrams of various control loops and other operations to provide hydraulic steering in accordance with embodiments of the disclosure.

Process 600A of FIG. 6A illustrates an intermediate view of an embodiment of virtual rudder estimator logic block 520 of FIGS. 5A and 5B similar to the embodiment illustrated in FIG. 5D, with minimal inputs. In some embodiments, process 600A may include startup detector logic block 620 (e.g., expanded upon in FIG. 8A), elasticity estimator logic block 622, ratchet balancing logic block 624 (e.g., expanded upon in FIG. 7A), bleed balancing logic block 626, linear balancing logic block 628, virtual rudder integrator logic block 630, and/or various filters, switching blocks, and math function blocks, as shown.

Figure 6B:
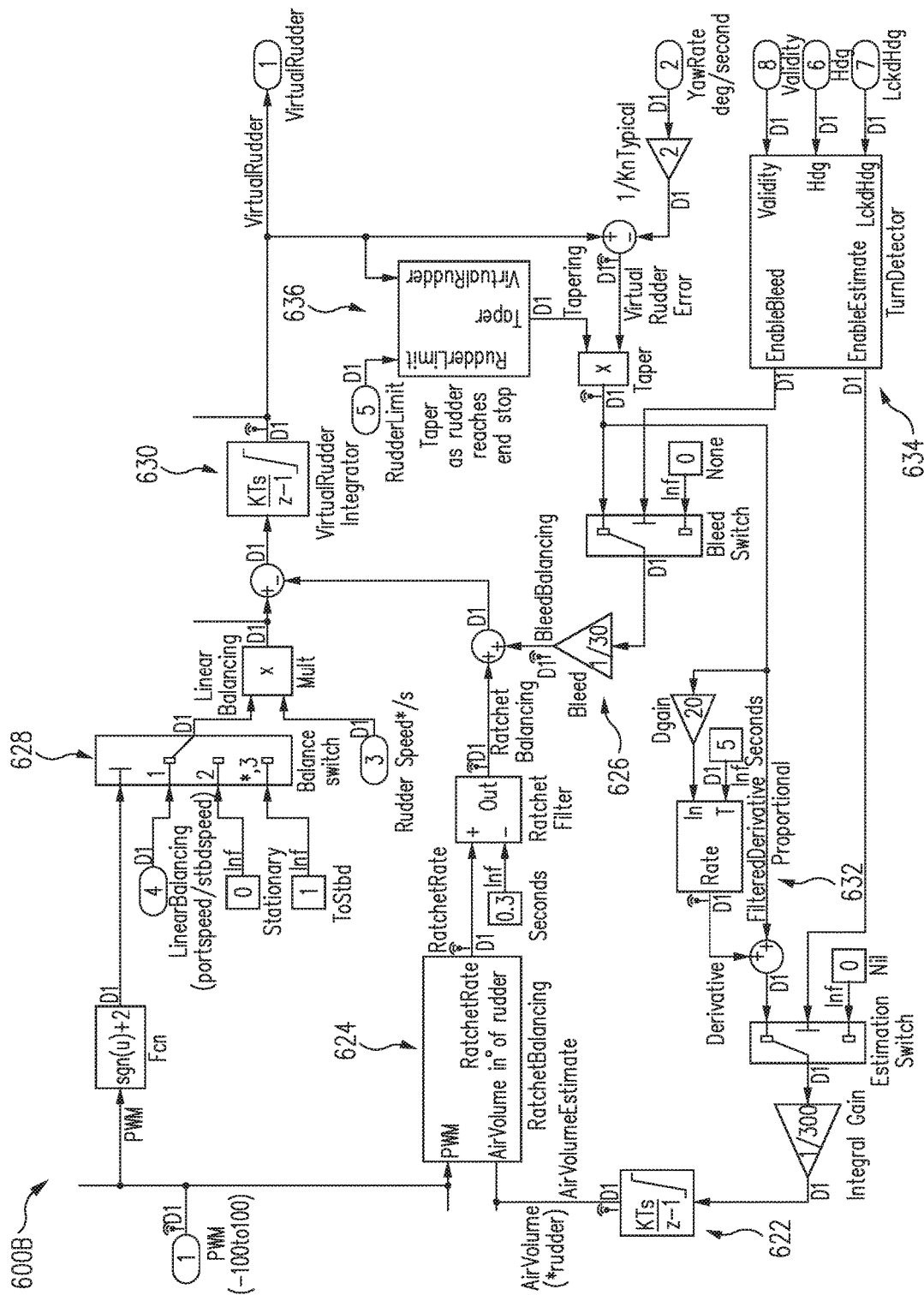
FIG. 6B illustrates flow diagrams of various control loops and other operations to provide hydraulic steering in accordance with embodiments of the disclosure.

Process 600B of FIG. 6B illustrates an intermediate view of an embodiment of virtual rudder estimator logic block 520 of FIGS. 5A and 5B similar to the embodiment illustrated in FIG. 5C, with a variety of inputs. In some embodiments, process 600B may include elasticity estimator logic block 622, ratchet balancing logic block 624 (e.g., expanded upon in FIG. 7A), bleed balancing logic block 626, linear balancing logic block 628, virtual rudder integrator logic block 630, phase advance logic block 632, turn detector logic block 634 (e.g., expanded upon in FIG. 8B), taper logic block 636 (e.g., expanded upon in FIG. 9), and/or various filters, switching blocks, and math function blocks, as shown.

Bleed balancing logic block 626 of FIGS. 6A and 6B substantially maintains the virtual rudder estimate at a mean value consistent with the mean yaw rate. For example, a boat under autopilot attempting to align a mobile structure with a target heading typically has a mean yaw rate of zero and so may also have a mean virtual rudder estimate of zero. The corresponding actual rudder angle may not be zero (e.g., this offset is often referred to as the "standing helm"), but because the standing helm cannot be measured without a reference transducer, users typically accept that the rudder angle displayed by an autopilot without a reference transducer has a mean value of zero when the boat is on a fixed locked heading. The bleed balancing time constant is set to 30 s in logic block 626, which means that it takes 30 s for an offset in the virtual rudder estimate to be 66% eliminated.

Figure 7A:
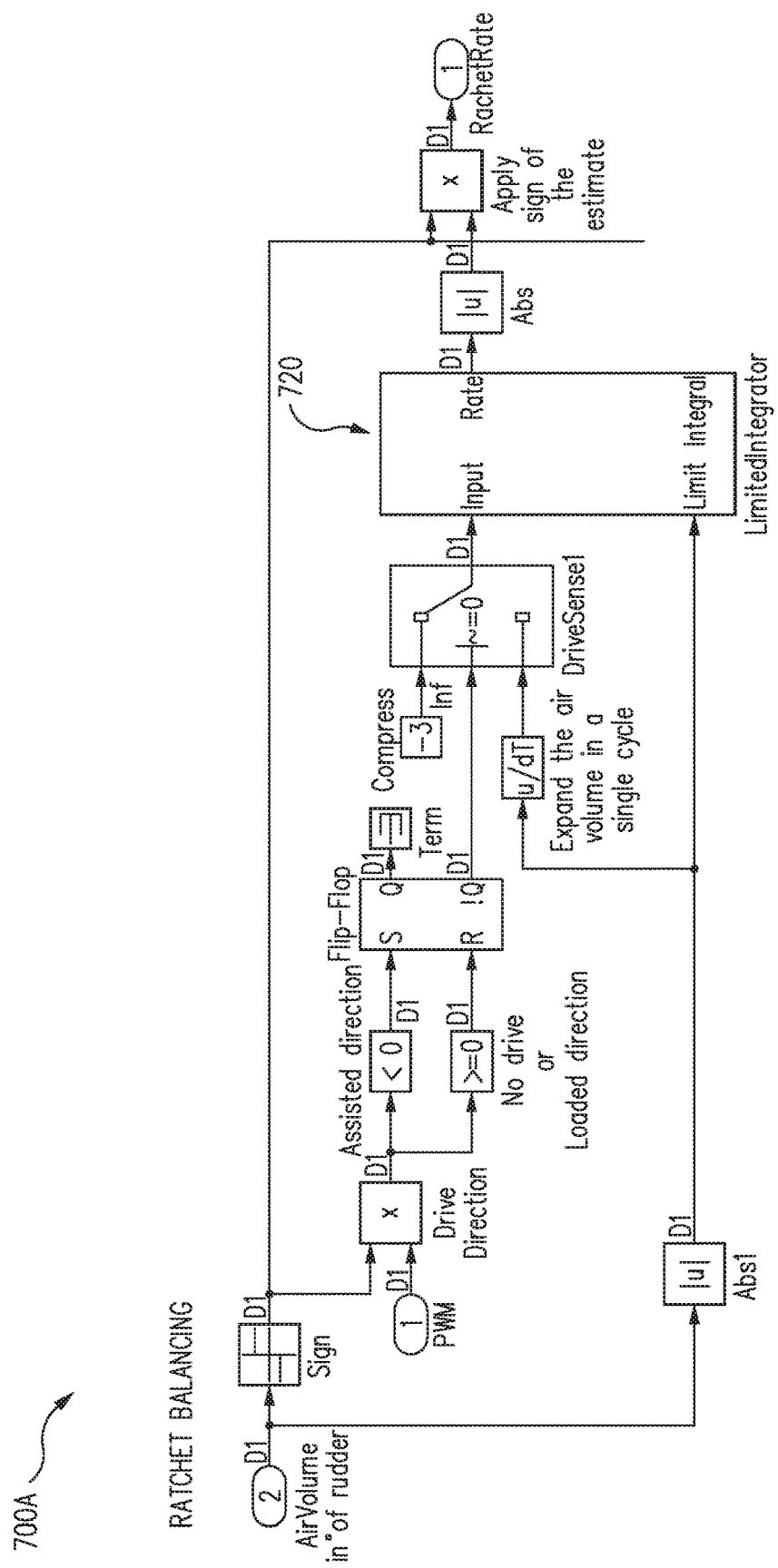
FIG. 7A illustrates flow diagrams of various control loops and other operations to provide hydraulic steering in accordance with embodiments of the disclosure.

Process 700A of FIG. 7A illustrates an intermediate view of an embodiment of ratchet balancing logic block 624 of FIGS. 6A and 6B. In some embodiments, process 700A may include limited integrator logic block 720 and/or various filters, switching blocks, and math function blocks, as shown.

Ratchet balancing logic block 624 applies a matching hydraulic slip in the virtual rudder estimate when drive is applied in the assisted direction. The size of the displacement is double the size of the elasticity estimate (loosely termed "air volume" in the diagram). Because non-linear hydraulic slip manifests as an offset mean rudder angle, the elasticity estimate can be determined directly by integration feedback in the "Air Volume integrator." The output of the ratchet balancer is applied through a filter to model the natural 'give' in a steering system (e.g., assume real steering systems respond over ⅓ second).

Ratchet balancing logic block 624 provides a displacement for each pulse in the assisted direction. Multiple pulses in quick succession give more complex dynamics, so the implementation in the diagram has been modeled as closely as possible to the physics of the pump valves. When the PWM direction matches the sign of the assisted direction (the elasticity estimate is a signed number) the flip flop is reset allowing a single cycle expansion of the limited integrator, thereby fully expanding the bubble. As soon as the drive stops (or reverses) the bubble is compressed again at a fixed rate of approximately 3°/s (though this could be replaced with a known rudder rate). Because the output of ratchet balancing logic block 624 is used to adjust the rudder velocity, the output is the rate of change of the integrator. The sign includes the ratchet effect: both expansion and compression provide a signal of matching sign, and so the sign of the effect is determined by the sign of the elasticity estimate.

Figure 7B:
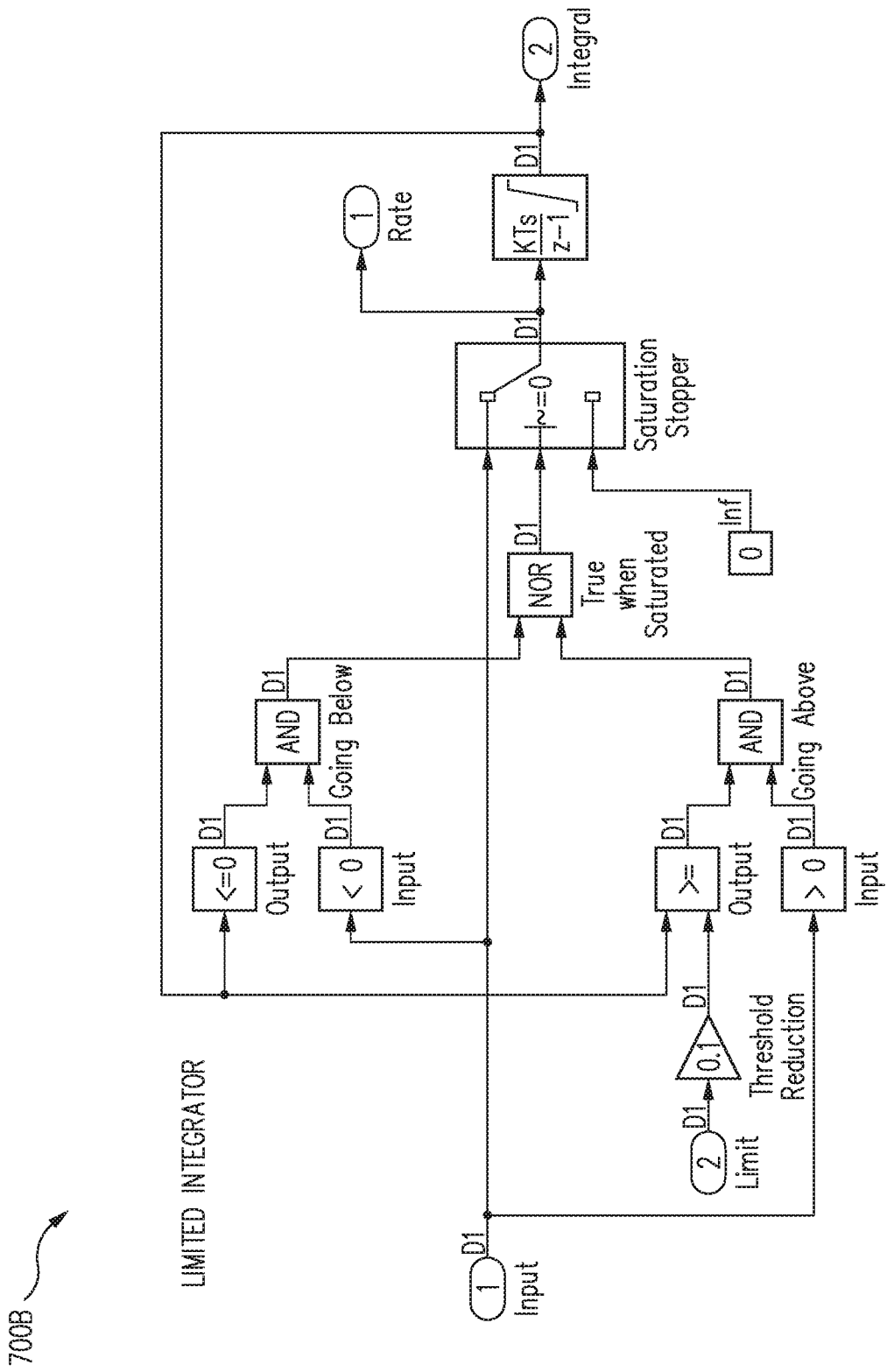
FIG. 7B illustrates flow diagrams of various control loops and other operations to provide hydraulic steering in accordance with embodiments of the disclosure.

Process 700B of FIG. 7B illustrates a bottom level view of an embodiment of limited integrator logic block 720 of FIG. 7A. In some embodiments, process 700B may include various filters, switching blocks, and math function blocks, as shown.

Figure 8A:
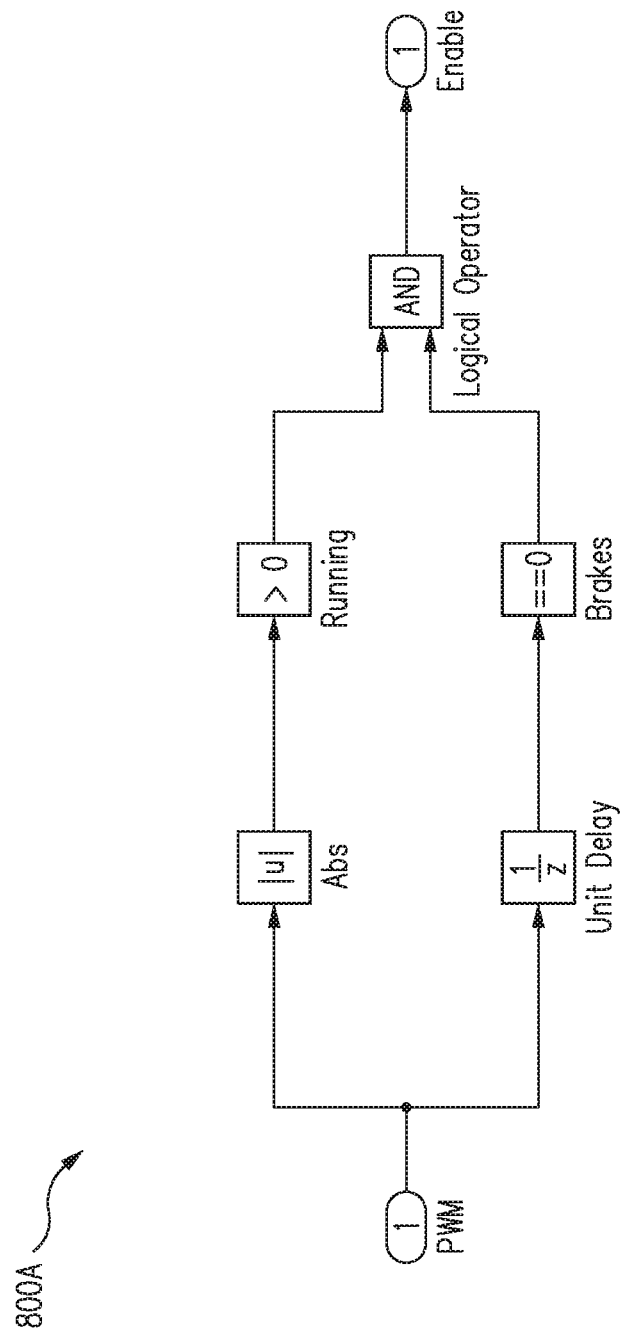
FIG. 8A illustrates flow diagrams of various control loops and other operations to provide hydraulic steering in accordance with embodiments of the disclosure.

Process 800A of FIG. 8A illustrates a bottom level view of an embodiment of startup detector logic block 620 of FIG. 6A. In some embodiments, process 800A may include various math function blocks, as shown.

The signal used to drive ratchet balancing logic block 624 is unwanted asymmetry in the virtual rudder estimate, so in situations where there is natural asymmetry, such as large user demanded course change or a large wave disturbance, it is important to avoid rapid build-up of the elasticity estimate. There are two scenarios to consider: (1) frequent small reversals of the pump, with the boat travelling on a more or less straight course, but with virtual rudder at a non-zero mean angle; (2) unidirectional pump drive out to a large rudder angle, followed by unidirectional pump drive back to center. The first situation requires the elasticity estimate to be adjusted as quickly as possible, until the virtual rudder estimate returns to zero. The second case requires no adjustment of the elasticity estimate, because there is no information on the extent of the ratcheting effect from such a scenario. In one embodiment, to prevent errors building up in the second scenario, but to promote rapid correction in the first, adjustment of the elasticity integrator is allowed only once per pump start-up cycle. This may be achieved with startup detector logic block 620.

Figure 8B:
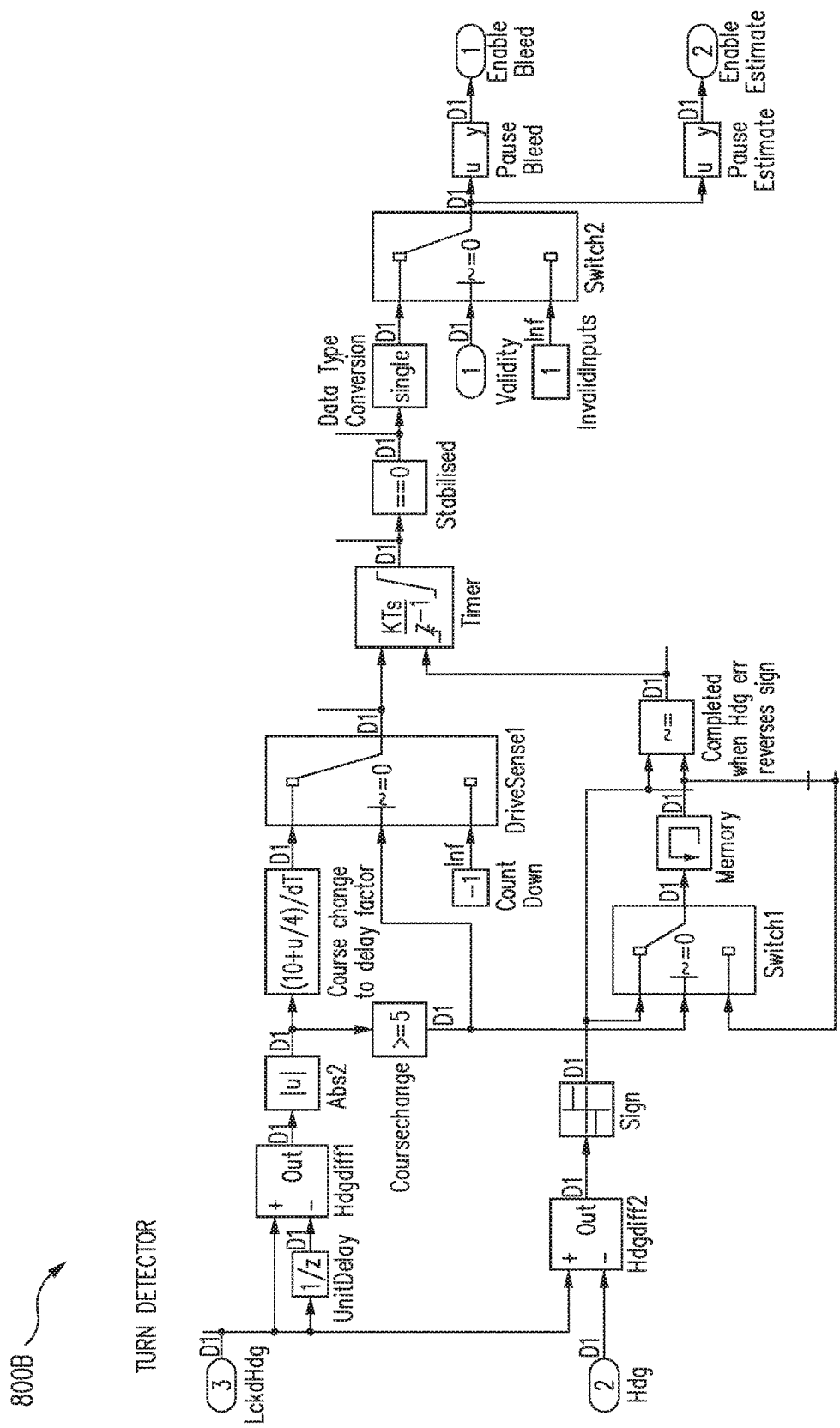
FIG. 8B illustrates flow diagrams of various control loops and other operations to provide hydraulic steering in accordance with embodiments of the disclosure.

Process 800B of FIG. 8B illustrates a bottom level view of an embodiment of turn detector logic block 634 of FIG. 6B. In some embodiments, process 800B may include various filters, switching blocks, and math function blocks, as shown.

Figure 9:
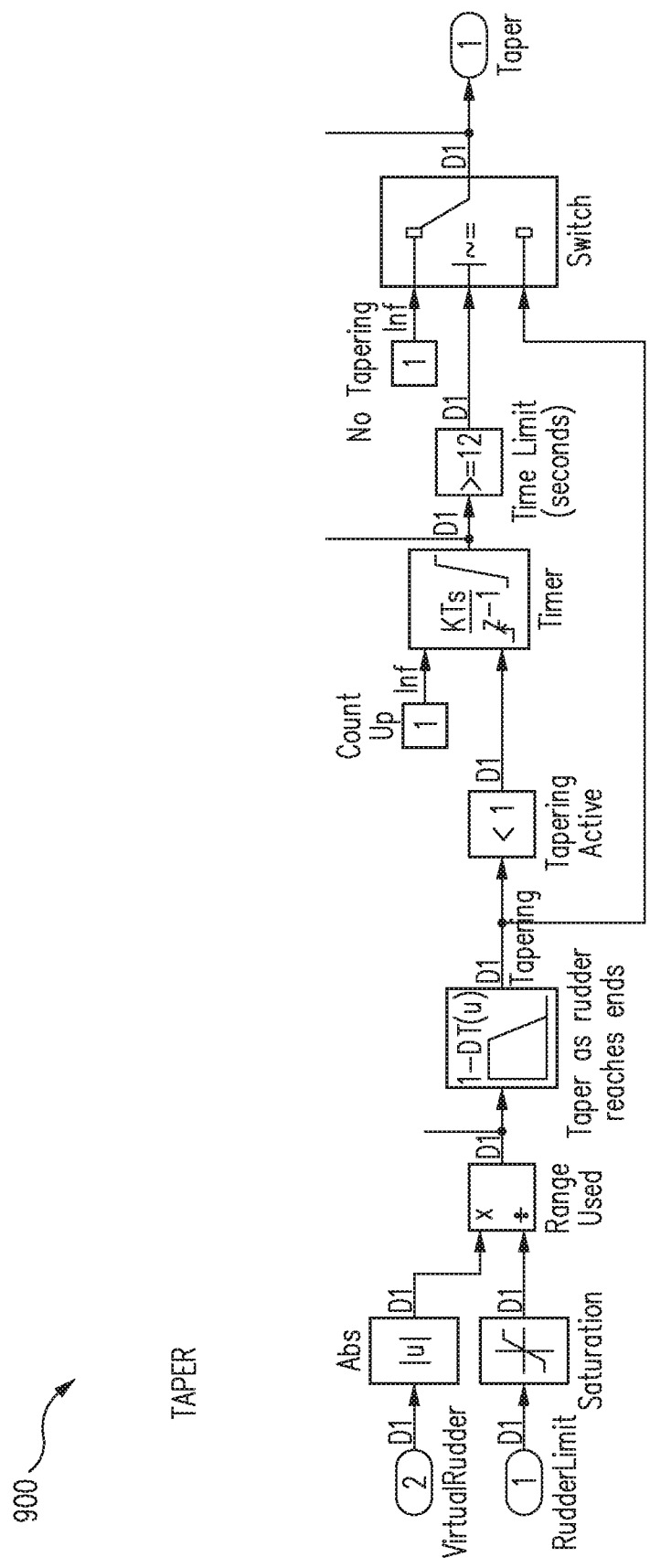
FIG. 9 illustrates flow diagrams of various control loops and other operations to provide hydraulic steering in accordance with embodiments of the disclosure.

Process 900 of FIG. 9 illustrates a bottom level view of an embodiment of taper logic block 636 of FIG. 6B. In some embodiments, process 900 may include various filters, switching blocks, and math function blocks, as shown.

Figure 10A:
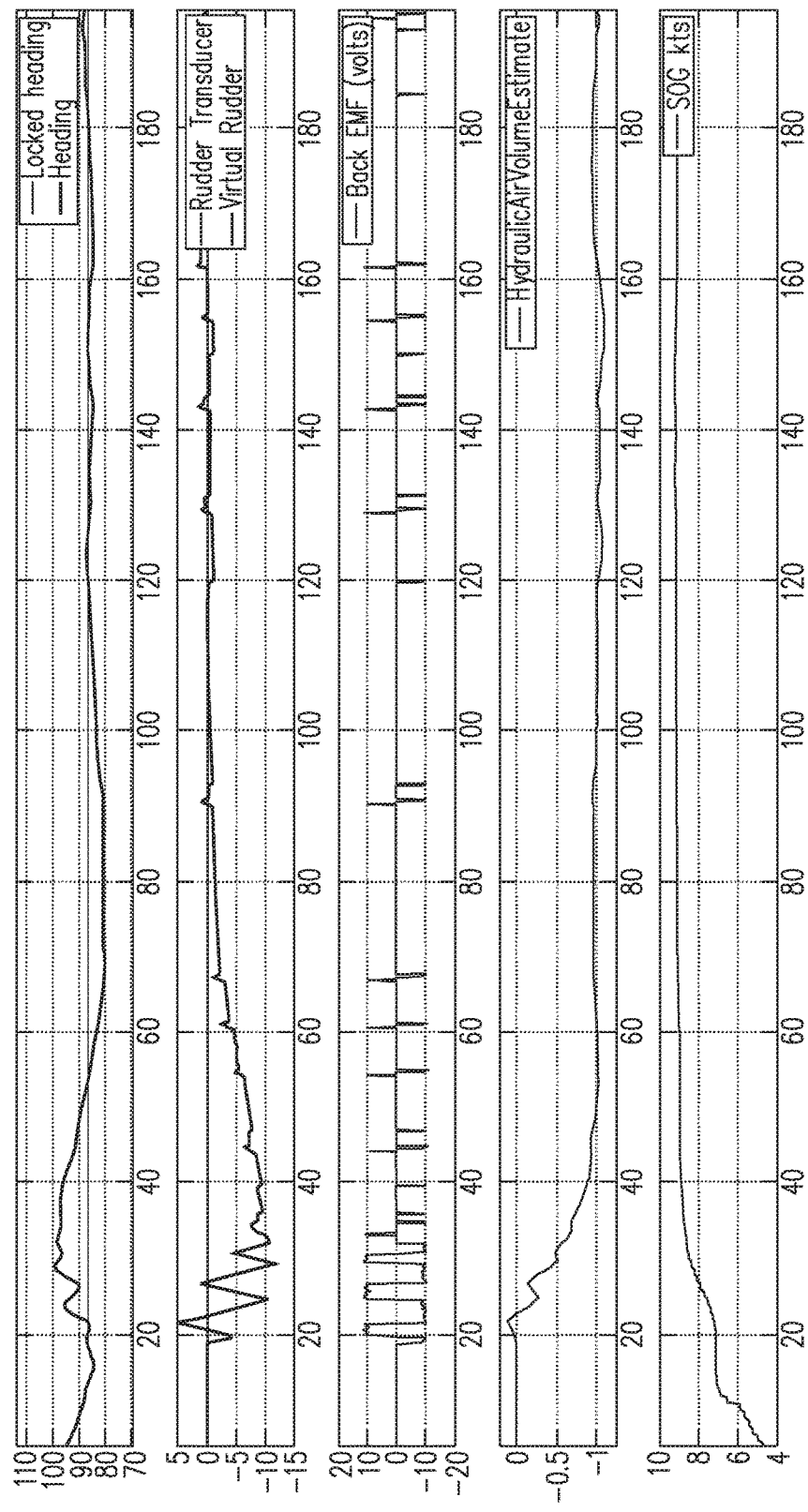
FIGS. 10A-10B illustrate graphs of experimental data derived from simulation of various control loops and other operations to provide hydraulic steering in accordance with embodiments of the disclosure.
Figure 10B:
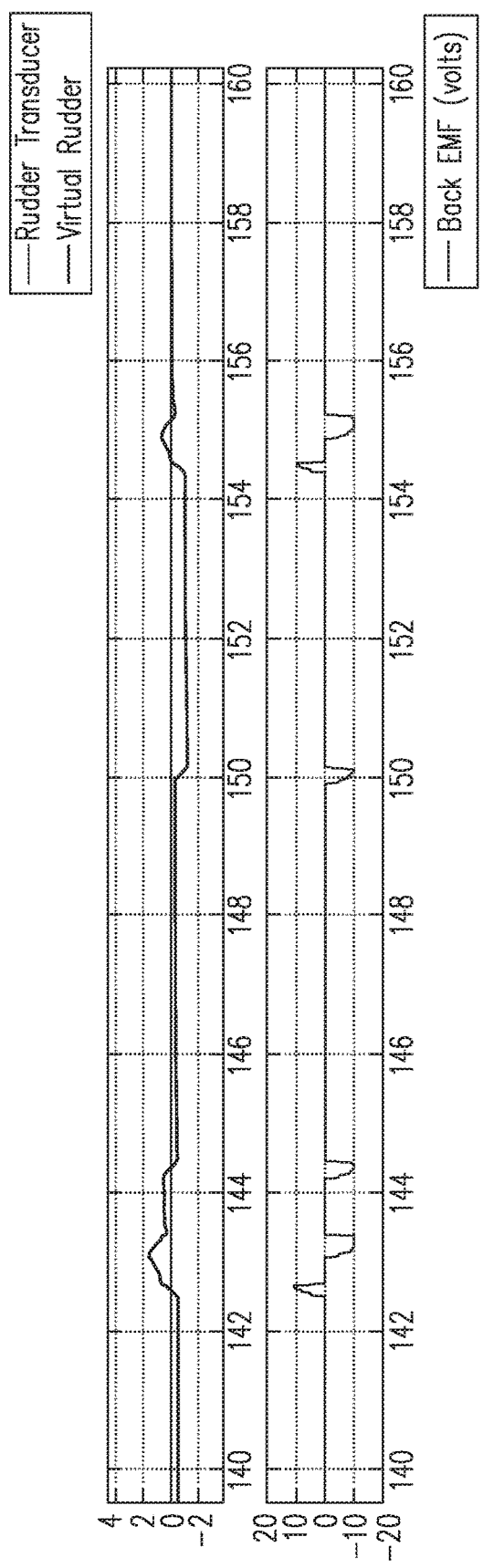

FIGS. 10A-10B illustrate graphs of experimental data derived from sea trials of various control loops and other operations to provide hydraulic steering in accordance with embodiments of the disclosure. FIG. 10A shows a starting estimate for the air volume as zero, and shows that the virtual rudder estimate initially becomes port biased, reaching −10° at 30 s. As a result, the heading reaches 100° where the target locked heading is 87°. However, the asymmetry caused the elasticity estimate to build and by 50 s it has reached −1°, which is sufficient to bring the virtual rudder back towards zero and to bring the heading error under control. As can be seen from FIG. 10B, once the air volume estimate has settled (e.g., around time 140 to 160), the small positive drive bursts (back EMF volts) produce relatively large jumps in the virtual rudder estimate due to the effect of the ratchet balancing, as described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   determining a linear rudder speed based, at least in part, on a pump control signal for controlling a hydraulic steering system of a mobile structure;
   determining an elasticity estimate for the hydraulic steering system;
   determining a virtual rudder estimate from a corrected rudder speed, wherein the corrected rudder speed is based, at least in part, on the linear rudder speed, the pump control signal, and/or the elasticity estimate; and
   transmitting an updated pump control signal based, at least in part, on the virtual rudder estimate, to the hydraulic steering system.

2. The method of claim 1, further comprising determining the linear rudder speed based, at least in part, on the pump control signal, a pump sensor signal, and/or a linear balancing coefficient for the hydraulic steering system.

3. The method of claim 1, further comprising determining the elasticity estimate by receiving the elasticity estimate as user input from a user interface and/or by retrieving the elasticity estimate from a machine readable medium.

4. The method of claim 1, further comprising:
determining a virtual rudder error based, at least in part, on a prior virtual rudder estimate; and
determining the elasticity estimate based, at least in part, on the virtual rudder error.

5. The method of claim 4, further comprising:
receiving a yaw rate for the mobile structure;
determining the virtual rudder error based, at least in part, on the prior virtual rudder estimate and the yaw rate; and
determining the elasticity estimate by accumulating the virtual rudder error and/or a phase advance compensated virtual rudder error.

6. The method of claim 4, further comprising:
receiving a rudder limit for the hydraulic steering system;
determining a taper coefficient based on the rudder limit and the prior virtual rudder estimate; and
tapering the virtual rudder error by scaling the virtual rudder error by the taper coefficient prior to determining the elasticity estimate.

7. The method of claim 4, wherein the corrected rudder speed is additionally based on a bleed balancing component, and wherein the bleed balancing component comprises the virtual rudder error scaled by a proper fraction with a value less than one-half.

8. The method of claim 1, further comprising:
receiving a measured heading, a target heading, and/or a heading validity status for the mobile structure;
determining the mobile structure is experiencing a course change based, at least in part, on the measured heading, the target heading, and/or the heading validity status; and
setting a virtual rudder error to zero before determining the elasticity estimate and/or a bleed balancing component.

9. The method of claim 1, further comprising:
determining that the hydraulic steering system is in a non-accumulation cycle; and
setting a virtual rudder error to zero before determining the elasticity estimate.

10. The method of claim 1, further comprising:
determining a ratchet balancing component based on the pump control signal and the elasticity estimate; and
determining the corrected rudder speed based, at least in part, on the linear rudder speed and/or the ratchet balancing component.

11. The method of claim 1, further comprising:
receiving a rudder demand corresponding to a target heading;
determining a rudder error based, at least in part, on the rudder demand and/or the virtual rudder estimate;
converting the rudder error into a corresponding pump control signal for the hydraulic steering system; and
transmitting the corresponding pump control signal to the hydraulic steering system.

12. The method of claim 11, further comprising quantizing the rudder error according to a selected one of a plurality of quantization levels prior to converting the quantized rudder error into the corresponding pump control signal.

13. A system comprising:
a logic device configured to receive one or more sensor and/or control signals and determine a virtual rudder estimate for use in controlling a hydraulic steering system coupled to a mobile structure, wherein the logic device is configured to:
receive a pump control signal for the hydraulic steering system and determine a linear rudder speed based, at least in part, on the pump control signal;
determine an elasticity estimate for the hydraulic steering system;
determine the virtual rudder estimate from a corrected rudder speed, wherein the corrected rudder speed is based, at least in part, on the linear rudder speed, the pump control signal, and/or the elasticity estimate; and
transmit an updated pump control signal based, at least in part, on the virtual rudder estimate, to the hydraulic steering system.

14. The system of claim 13, wherein the logic device is configured to determine the linear rudder speed based, at least in part, on the pump control signal, a pump sensor signal, and/or a linear balancing coefficient for the hydraulic steering system.

15. The system of claim 13, wherein the logic device is configured to determine the elasticity estimate by receiving the elasticity estimate as user input from a user interface and/or by retrieving the elasticity estimate from a machine readable medium.

16. The system of claim 13, wherein the logic device is configured to:
determine a virtual rudder error based, at least in part, on a prior virtual rudder estimate; and
determine the elasticity estimate based, at least in part, on the virtual rudder error.

17. The system of claim 16, wherein the logic device is configured to:
receive a yaw rate for the mobile structure;
determine the virtual rudder error based, at least in part, on the prior virtual rudder estimate and the yaw rate; and
determine the elasticity estimate by accumulating the virtual rudder error and/or a phase advance compensated virtual rudder error.

18. The system of claim 16, wherein the logic device is configured to:
receive a rudder limit for the hydraulic steering system;
determine a taper coefficient based on the rudder limit and the prior virtual rudder estimate; and
taper the virtual rudder error by scaling the virtual rudder error by the taper coefficient prior to determining the elasticity estimate.

19. The system of claim 16, wherein the corrected rudder speed is additionally based on a bleed balancing component, and wherein the bleed balancing component comprises the virtual rudder error scaled by a proper fraction with a value less than one-half.

20. The system of claim 13, wherein the mobile structure comprises a watercraft, aircraft, robot, drone, and/or other type of vehicle, and wherein the logic device is configured to:
receive a measured heading, a target heading, and/or a heading validity status for the mobile structure;
determine the mobile structure is experiencing a course change based, at least in part, on the measured heading, the target heading, and/or the heading validity status; and
set a virtual rudder error to zero before determining the elasticity estimate and/or a bleed balancing component.

21. The system of claim 13, wherein the logic device is configured to:
  determine that the hydraulic steering system is in a non-accumulation cycle; and
  set a virtual rudder error to zero before determining the elasticity estimate.

22. The system of claim 13, wherein the logic device is configured to:
  determine a ratchet balancing component based on the pump control signal and the elasticity estimate, wherein the ratchet balancing component is configured to compensate for an elastic response of the hydraulic steering system to the pump control signal; and
  determine the corrected rudder speed based, at least in part, on the linear rudder speed and/or the ratchet balancing component.

23. The system of claim 13, wherein the logic device is configured to:
  receive a rudder demand corresponding to a target heading;
  determine a rudder error based, at least in part, on the rudder demand and/or the virtual rudder estimate;
  convert the rudder error into a corresponding pump control signal for the hydraulic steering system; and
  transmit the corresponding pump control signal to the hydraulic steering system.

24. The system of claim 22, wherein the logic device is configured to quantize the rudder error according to a selected one of a plurality of quantization levels prior to converting the quantized rudder error into the corresponding pump control signal.

* * * * *